United States Patent
Yoshida

(10) Patent No.: US 12,436,917 B2
(45) Date of Patent: Oct. 7, 2025

(54) INFORMATION PROCESSING DEVICE FOR INTEGRATING IMAGE INFORMATION FILE AND DATABASE FILE INTO SINGLE EXTENDED IMAGE FILE

(71) Applicant: BROTHER KOGYO KABUSHIKI KAISHA, Nagoya (JP)

(72) Inventor: Junjiro Yoshida, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/609,085

(22) Filed: Mar. 19, 2024

(65) Prior Publication Data
US 2024/0330240 A1    Oct. 3, 2024

(30) Foreign Application Priority Data
Mar. 31, 2023    (JP) ................................ 2023-057727

(51) Int. Cl.
*G06F 16/16*    (2019.01)
*G06F 16/17*    (2019.01)
*G06K 15/02*    (2006.01)

(52) U.S. Cl.
CPC ............ *G06F 16/164* (2019.01); *G06F 16/17* (2019.01); *G06K 15/1807* (2013.01)

(58) Field of Classification Search
CPC .... G06F 16/17; G06F 16/164; G06K 15/1807
See application file for complete search history.

(56) References Cited

U.S. PATENT DOCUMENTS

| | | | | |
|---|---|---|---|---|
| 6,219,668 B1 * | 4/2001 | Arnaud | ................... | G06Q 10/10 709/203 |
| 7,281,049 B2 * | 10/2007 | Verma | ..................... | H04L 67/02 709/227 |
| 8,857,951 B2 * | 10/2014 | Song | ......................... | B41J 2/51 347/37 |
| 11,853,627 B2 * | 12/2023 | Yasuda | ................. | H04L 63/083 |
| 2004/0017583 A1 * | 1/2004 | Kageyama | ............ | G06F 3/1204 358/1.15 |

(Continued)

FOREIGN PATENT DOCUMENTS

JP    2019-211904 A    12/2019

*Primary Examiner* — Etienne P Leroux
(74) *Attorney, Agent, or Firm* — KENEALY VAIDYA LLP

(57) ABSTRACT

An information processing device includes a communication interface, and a controller. The communication interface is configured to communicate with a printing device. The controller performs an acquiring process to acquire a database. The controller performs an image generation process to generate a print image in which a data image is incorporated. The data image represents a set of data designated by a user from one or more sets of data included in the database. The controller performs a first generation process to generate an image information file including image information to be used to render the print image. The controller performs a second generation process to generate a database file based on the database; an integration process to integrate the image information file and the database file into a single extended image file. The controller performs a saving process to save the extended image file in a saving folder.

23 Claims, 24 Drawing Sheets

(56) References Cited

U.S. PATENT DOCUMENTS

| | | | |
|---|---|---|---|
| 2006/0209329 A1* | 9/2006 | Akiyama | G06F 3/1284 358/1.13 |
| 2008/0137114 A1* | 6/2008 | Sanami | G06F 40/186 358/1.9 |
| 2009/0327209 A1* | 12/2009 | Dunietz | G06Q 10/06 707/E17.127 |
| 2014/0355054 A1* | 12/2014 | Oi | G06K 15/1817 358/1.15 |
| 2017/0132461 A1* | 5/2017 | Chan | G06T 11/00 |
| 2019/0369928 A1 | 12/2019 | Ishii | |
| 2020/0358790 A1* | 11/2020 | Contreras | H04L 67/02 |
| 2020/0394005 A1* | 12/2020 | Kusumoto | G06F 3/1298 |
| 2021/0187963 A1* | 6/2021 | Heath | G03G 15/224 |

\* cited by examiner

FIG. 11
1a: CREATE TEMPORARY FOLDER (S240)
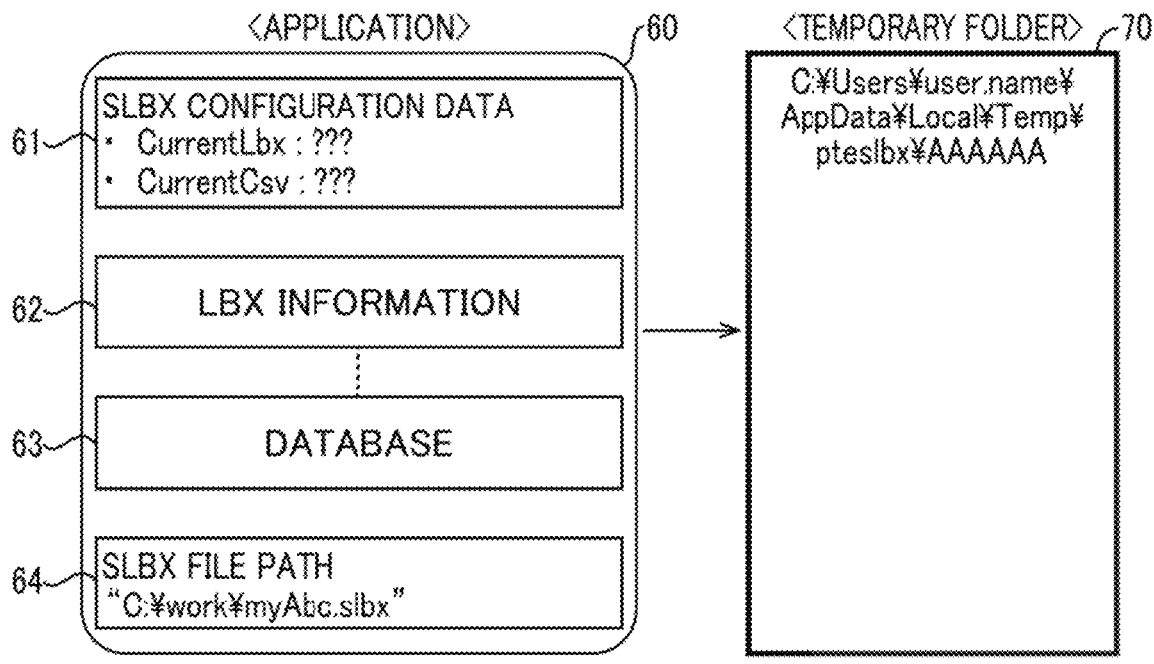
1b: INITIALIZE SLBX CONFIGURATION DATA (S220)
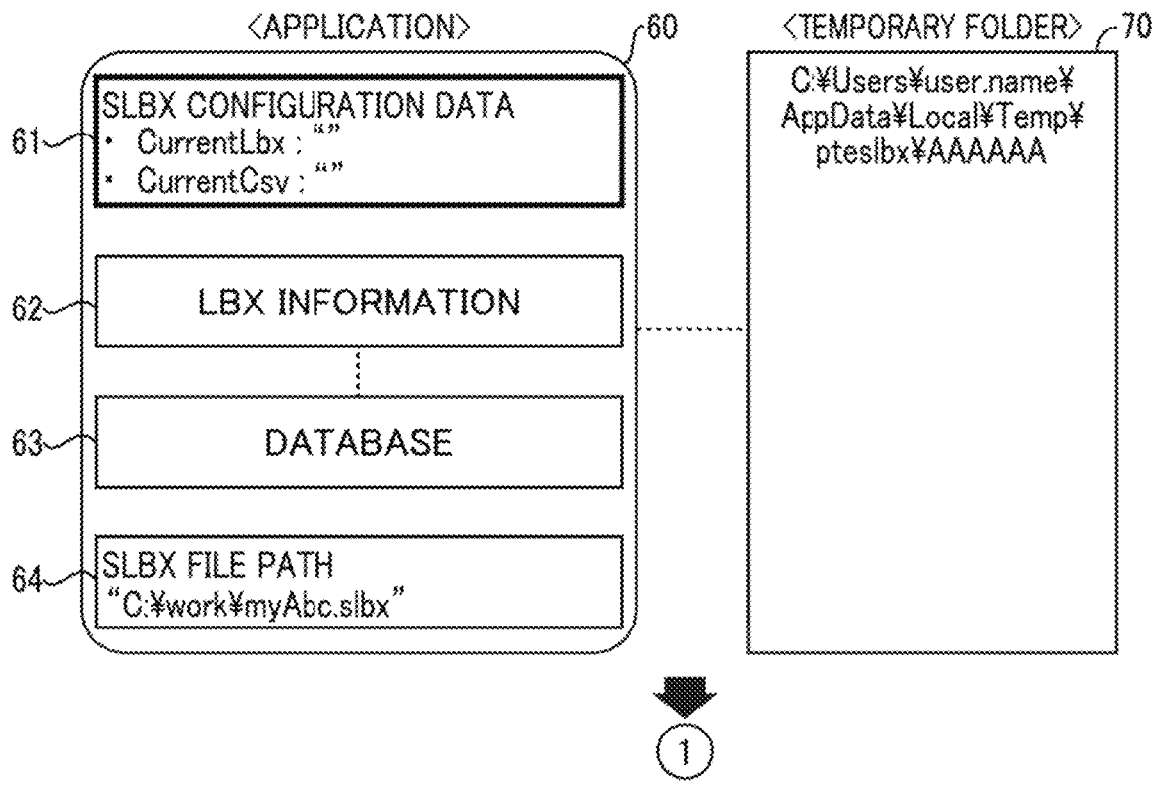

FIG. 12
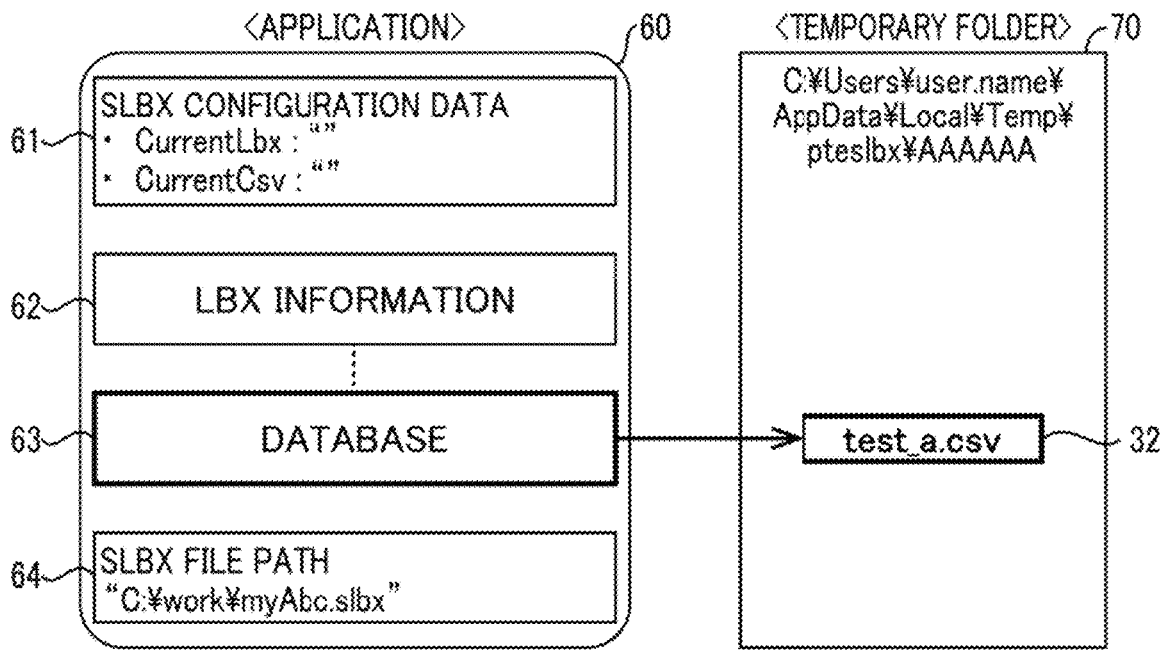
1c: SAVE DATABASE IN CSV FORMAT IN TEMPORARY FOLDER (S240)
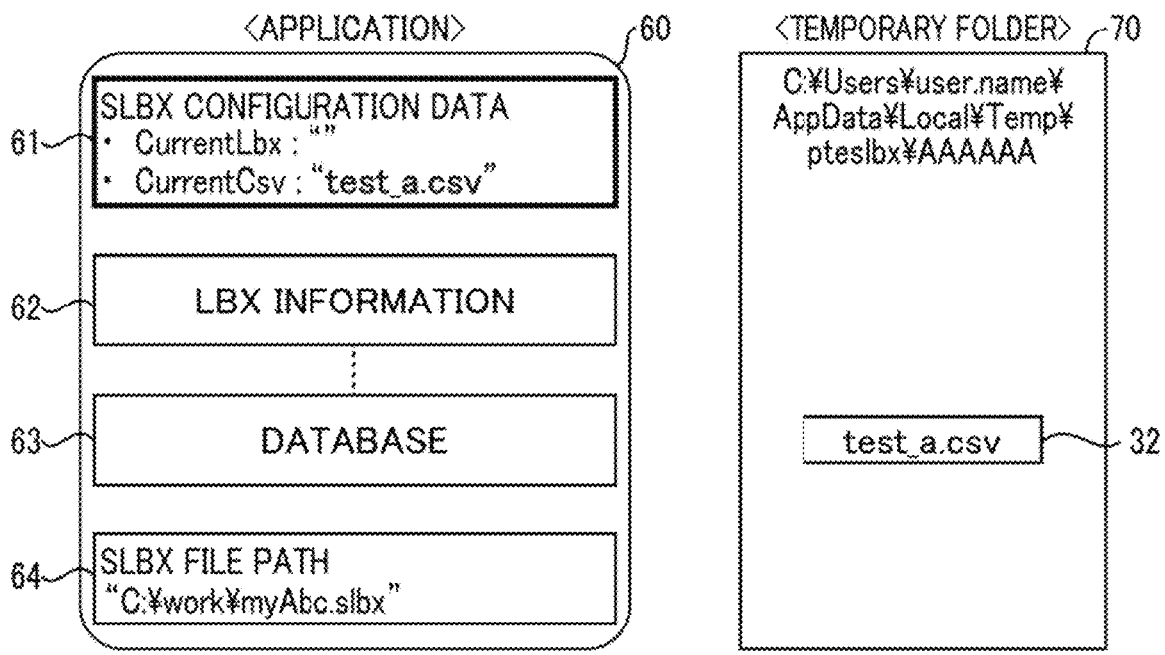
1d: UPDATE CSV FILE NAME IN SLBX CONFIGURATION DATA (S250)

FIG. 13
1e: SAVE LBX INFORMATION IN LBX FORMAT IN TEMPORARY FOLDER (S260)
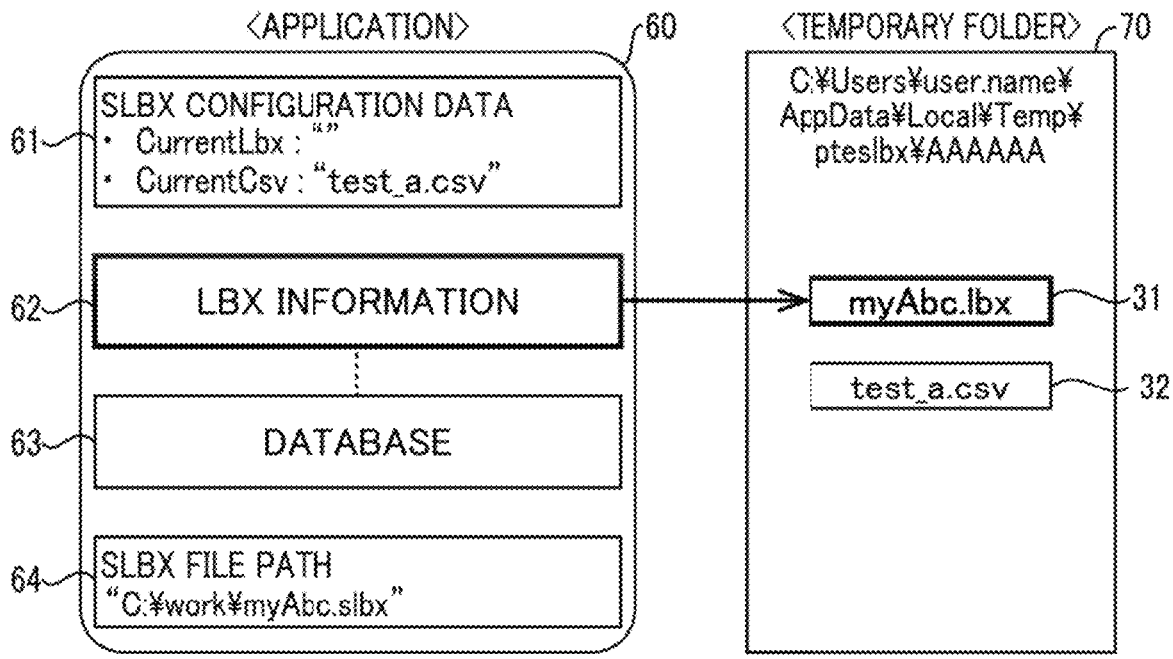
1f: UPDATE LBX FILENAME IN SLBX CONFIGURATION DATA (S270)
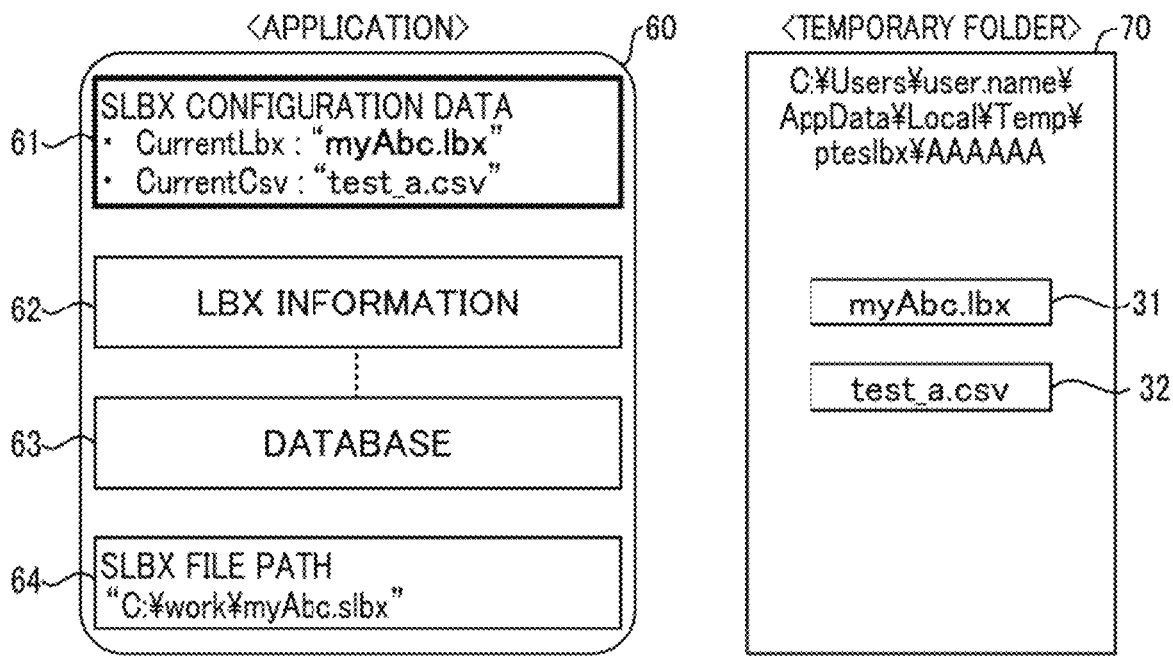

FIG. 14
1g: SAVE SLBX CONFIGURATION DATA IN PRESCRIBED FORMAT IN TEMPORARY FOLDER (S280)
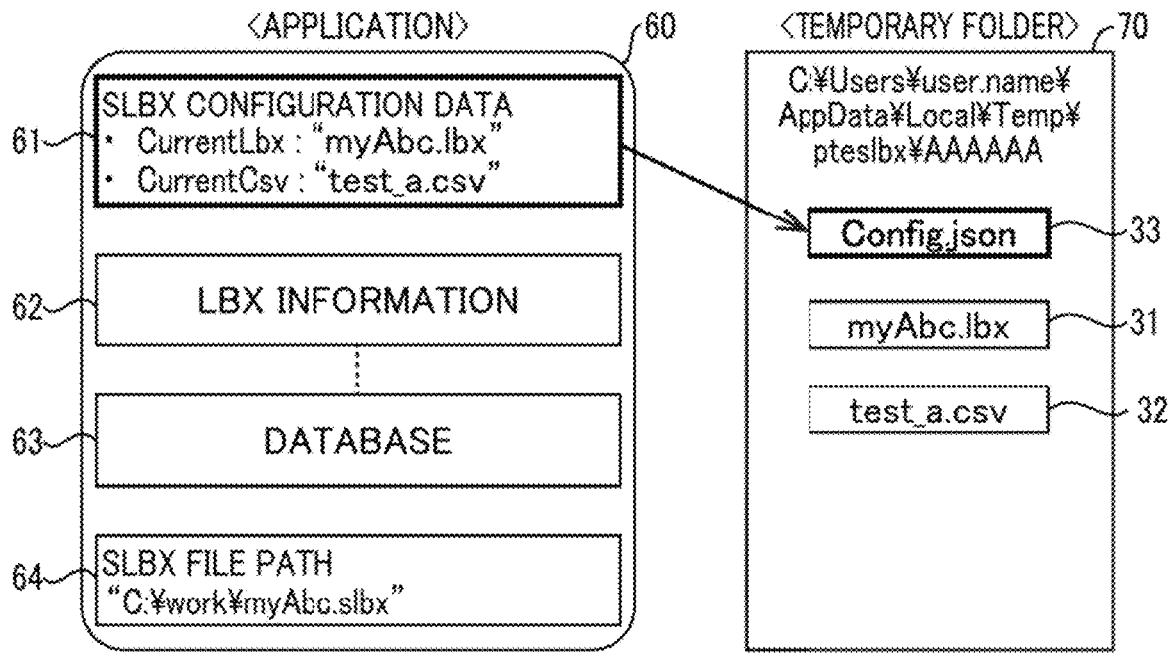
1h: GENERATE SLBX FILE BY COMPRESSING FILES IN TEMPORARY FOLDER AND SAVE GENERATED SLBX FILE (S290)
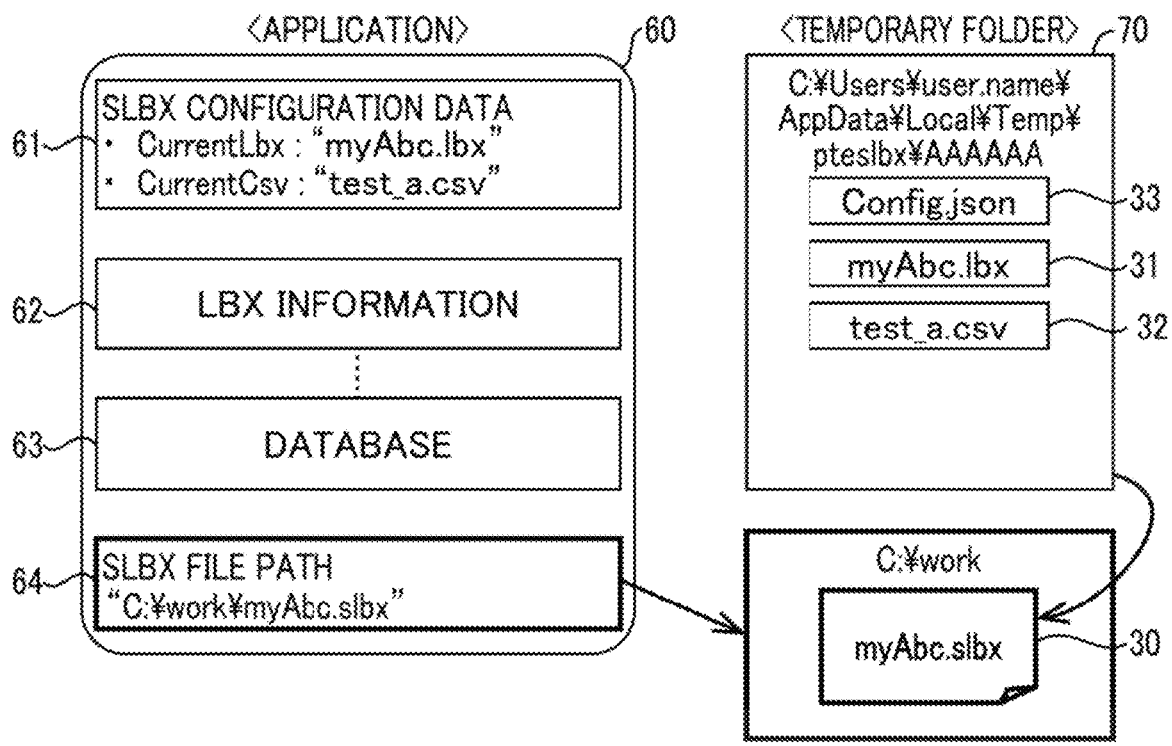

FIG. 18
2a: ACQUIRE FILE PATH FOR OPEN TARGET FILE (S410)
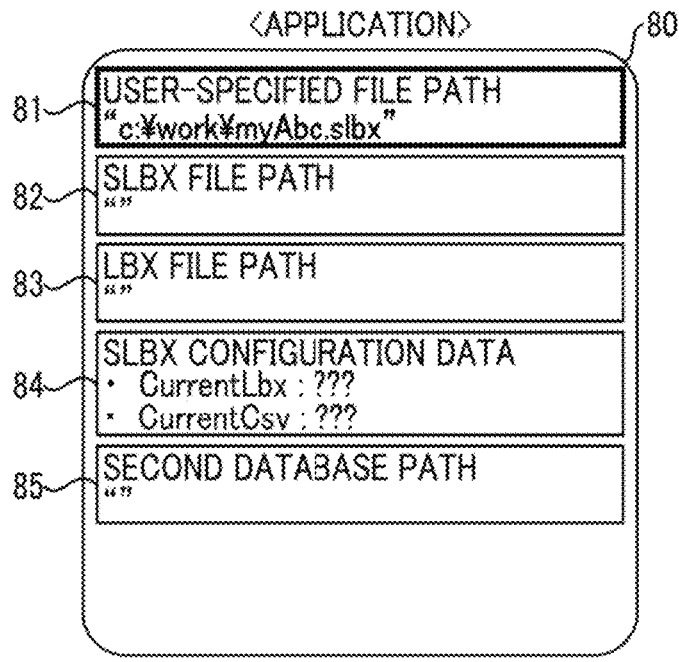
2b: CREATE NEW TEMPORARY FOLDER PATH (S430)
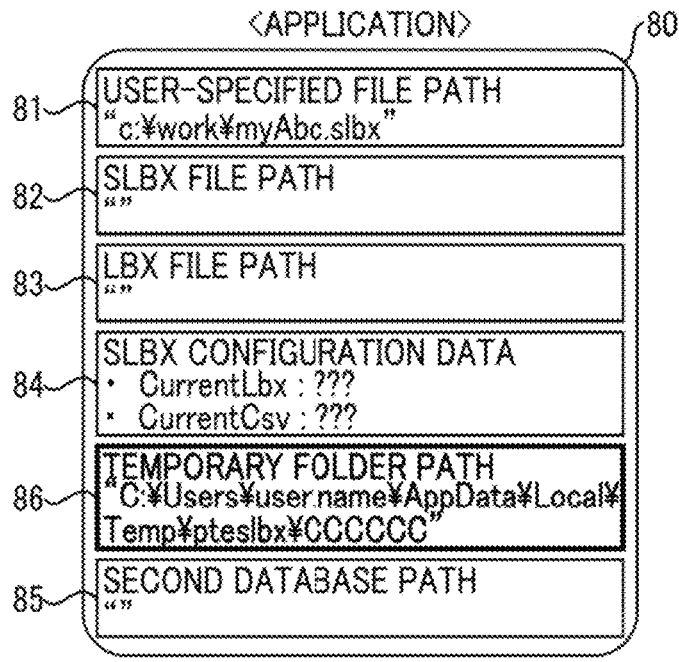

FIG. 19
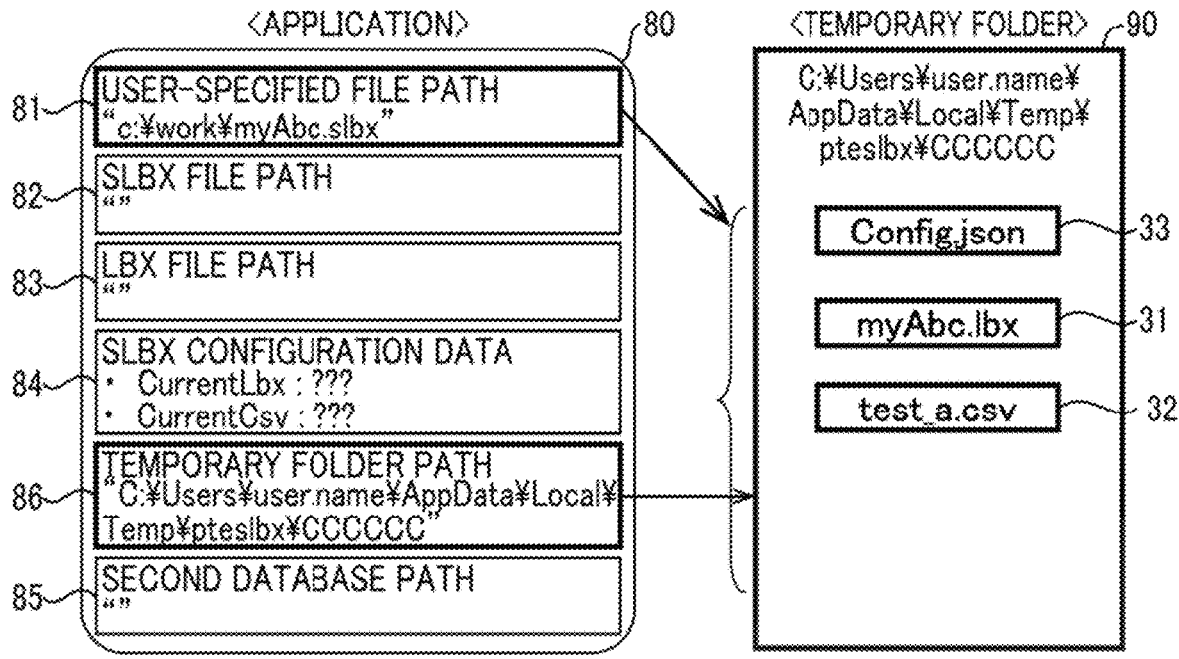
2c: DECOMPRESS SLBX FILE TO EXPAND FILES IN TEMPORARY FOLDER (S440)
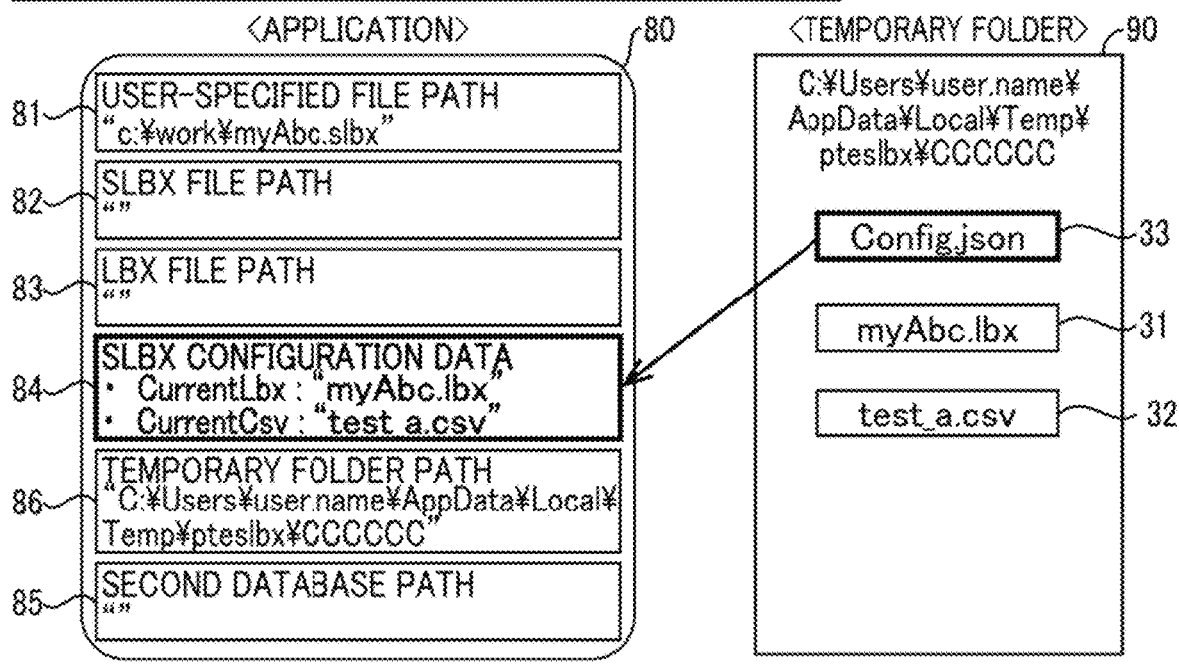
2d: WRITE INFORMATION FROM CONFIGURATION FILE IN TEMPORARY FOLDER TO SLBX CONFIGURATION DATA (S450)

INFORMATION PROCESSING DEVICE FOR INTEGRATING IMAGE INFORMATION FILE AND DATABASE FILE INTO SINGLE EXTENDED IMAGE FILE

REFERENCE TO RELATED APPLICATIONS

This application claims priority from Japanese Patent Application No. 2023-057727 filed on Mar. 31, 2023. The entire content of the priority application is incorporated herein by reference.

BACKGROUND ART

A conventional program generates a template for use in printing on a label printer. This program can acquire a database and generate a template that includes objects linked to that database.

SUMMARY

It is conceivable that users will want to save the generated template as a file, which the user can later open to edit the template or use the template to print on a printing device. It is also conceivable that links between the template and database should be properly maintained when the saved file is reopened.

In view of the foregoing, it is an object of the present disclosure to provide a technology to manage a database and a file to specify data in the database for rendering a print image. In order to attain the above and other object, the present disclosure provides a non-transitory computer readable storage medium storing a set of program instructions installed on and executed by a computer included in an information processing device. The information processing device further includes a communication interface configured to communicate with a printing device. The set of program instructions, when executed by the computer, causes the information processing device to perform: an acquiring process to acquire a database; an image generation process to generate a print image in which a data image is incorporated, the data image representing a set of data designated by a user from one or more sets of data included in the database; a first generation process to generate an image information file including image information to be used to render the print image; a second generation process to generate a database file based on the database; an integration process to integrate the image information file and the database file into a single extended image file; and a saving process to save the extended image file in a saving folder.

According to another aspect, the disclosure provides an information processing device. The information processing device includes a communication interface, and a controller. The communication interface is configured to communicate with a printing device. The controller is configured to perform: an acquiring process to acquire a database; an image generation process to generate a print image in which a data image is incorporated, the data image representing a set of data designated by a user from one or more sets of data included in the database; a first generation process to generate an image information file including image information to be used to render the print image; a second generation process to generate a database file based on the database; an integration process to integrate the image information file and the database file into a single extended image file; and a saving process to save the extended image file in a saving folder.

In the above structure, the image information file and the database are integrated into a single extended image file. Accordingly, the image information file used for rendering the print image can be managed appropriately together with the database file.

BRIEF DESCRIPTION OF DRAWINGS

FIG. 11 is a schematic diagram illustrating steps in the first saving process.

FIG. 12 is a schematic diagram illustrating steps in the first saving process following the steps of FIG. 11.

FIG. 13 is a schematic diagram illustrating steps in the first saving process following the steps of FIG. 12.

FIG. 14 is a schematic diagram illustrating steps in the first saving process following the steps of FIG. 13.

FIG. 18 is a schematic diagram illustrating steps in the LBX file opening process.

FIG. 19 is a schematic diagram illustrating steps in the LBX file opening process following the steps of FIG. 18.

DESCRIPTION

An embodiment will be described while referencing the accompanied drawings.

1. Embodiment (1-1) Configuration of a Printing System

Figure 1:
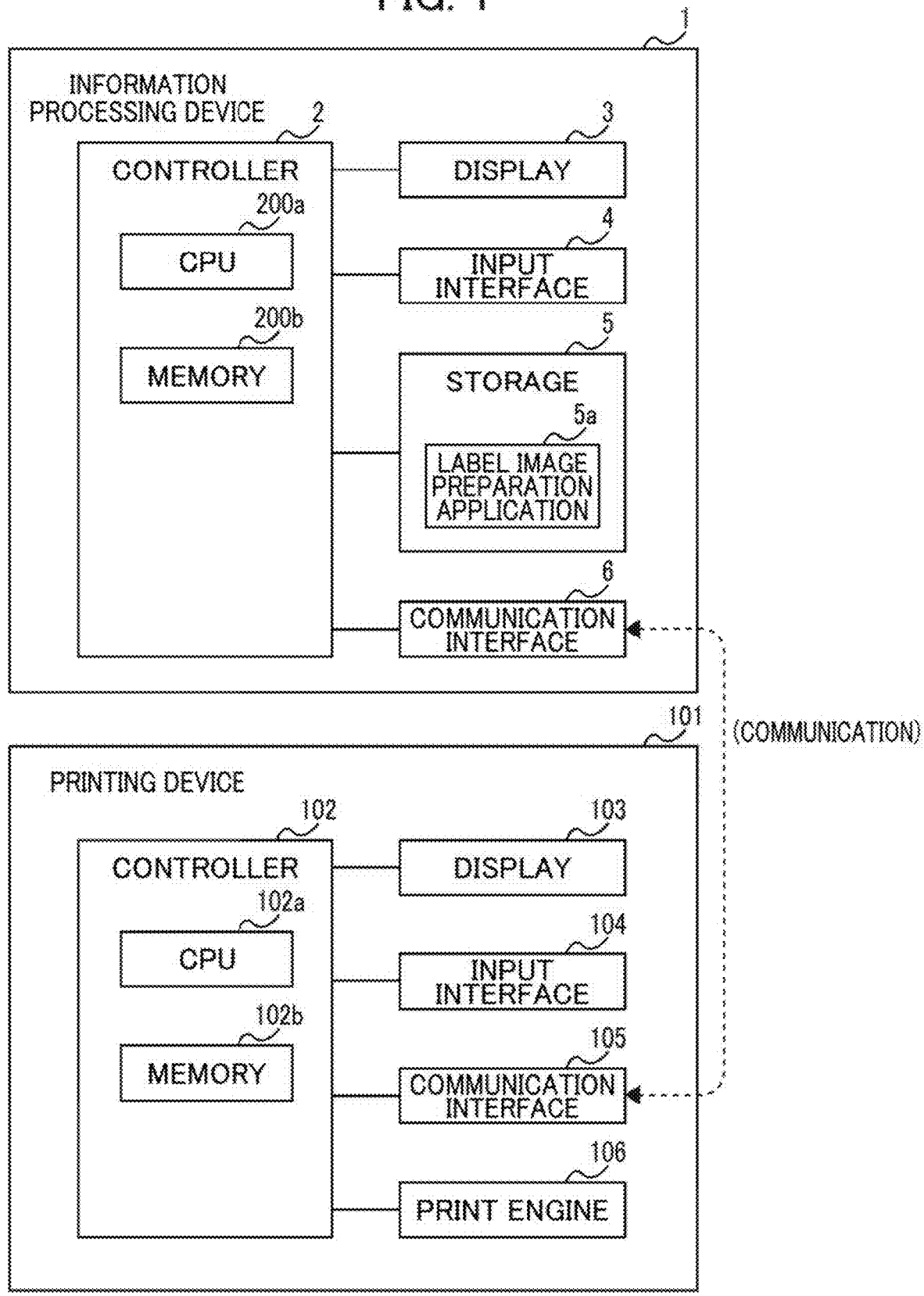
FIG. 1 is a block diagram illustrating a printing system.

FIG. 1 shows a printing system according to the embodiment. This printing system is provided with an information processing device 1, and a printing device 101. The information processing device 1 is configured to communicate with the printing device 101.

When the printing device 101 receives a print command containing image data from the information processing device 1, the printing device 101 can print an image represented by this image data on a print medium. In the present embodiment, the printing device 101 is in the form of a label printer or a label writer, for example.

That is, the print medium in the present embodiment has a continuous tape-like form. That is, the print medium is elongated in a lengthwise direction. The printing device 101 is configured to print images to be arranged in a lengthwise direction of the print medium.

After an image has been printed on the print medium, the printed portion is cut and/or peeled off for use as a label. Labels can be affixed to name tags, the spines of files, price tags in stores, postal envelopes, industrial materials, supplies, personal organizers, signs, and various other objects. Hereinafter, a single image included on one label will be referred to as a "label image".

The information processing device 1 can generate and transmit a print command to the printing device 101. The information processing device 1 can also execute a label image preparation application 5*a*. The label image preparation application 5*a* is software that includes a computer program for preparing a label image to be printed by the printing device 101. The preparation of a label image may include the editing of the label image that have already been created and the creation of a new image. The user of the printing system can create a label image on the information processing device 1 using the label image preparation application 5*a*.

When the information processing device 1 receives a print instruction for a label image that has been prepared, the information processing device 1 transmits image data representing this label image to the printing device 101. Specifically, the information processing device 1 in the present embodiment generates a print command that includes this image data and transmits this print command to the printing device 101.

The information processing device 1 may communicate with the printing device 101 using any method of communication. For example, the information processing device 1 and the printing device 101 can communicate with each other via cables or wirelessly. Methods of wireless communication include wireless LAN and Bluetooth, for example. "Bluetooth" is a U.S. registered trademark of the Bluetooth SIG, Inc. Methods of wireless communication may include Universal Serial Bus (USB) and wired LAN, for example.
(1-2) Configuration of the Image Processing Device As shown in FIG. 1, the information processing device 1 is provided with a controller 2, a display 3, an input interface 4, a storage 5, and a communication interface 6. The controller 2 is provided with a CPU 200*a*, and a memory 200*b*. The CPU 200*a* functions as a processor to execute processes in accordance with computer programs stored in the memory 200*b* and the storage 5. The memory 200*b* may have semiconductor memory such as ROM, RAM, NVRAM, and flash memory.

The storage 5 includes such storage as a solid-state drive (SSD) and a hard disk drive (HDD) for storing various computer programs and data. Programs stored in the present embodiment include an operating system (hereinafter abbreviated as "OS") and a printer driver. The printer driver is software that allows the information processing device 1 to control the printing device 101.

The label image preparation application 5*a* described above is also stored in the storage 5. The label image preparation application 5*a* implements an image preparation function. The image preparation function involves creating a label image based on operations from users of the printing system and transmitting a print command containing image data that represents this label image to the printing device 101 via the printer driver. The controller 2 implements the image preparation function by executing the label image preparation application 5*a*. In the present embodiment, the OS, the printer driver, and the label image preparation application 5*a* are installed and used on the information processing device 1.

The label image preparation application 5*a* may have some or all of the printer drive functions. That is, the label image preparation application 5*a* may be configured to transmit prepared image data to the printing device 101 without the need for an application program separate from the label image preparation application 5*a*.

In the following description, the agent responsible for executing the program (e.g., the controller 2 in the information processing device 1) may be referred to simply by the program name or the software name. For example, "the label image preparation application 5*a*" may be used in the following description in place of the more specific description, "the controller 2 executing the label image preparation application 5*a*".

The OS may have any type of configuration. For example, the OS may be Windows (a U.S. registered trademark of Microsoft Corporation), macOS (a U.S. registered trademark of Apple Inc.), or any other OS.

The label image preparation application 5*a* is installed and used on a computer system that includes an OS. The OS has a file system. The file system manages various files. The details of such file systems are generally well known as a function of an OS and will not be described herein. The label image preparation application 5*a* may also be executed without having to be installed on the computer system.

The label image preparation application 5*a* may be stored in the storage 5 in any manner. For example, the label image preparation application 5*a* may be read into the information processing device 1 from a storage medium, such as a CD, DVD, or USB memory, and stored in the storage 5. Alternatively, the label image preparation application 5*a* may be downloaded to the information processing device 1 from a prescribed server (e.g., a server managed by the vendor of the printing device 101) via a network and stored in the storage 5. The label image preparation application 5*a* may also be stored in the storage 5 prior to the information processing device 1 being shipped from the factory.

The display 3 is configured to display various screens to the user of the information processing device 1. Examples of the display 3 include a liquid crystal display. Examples of the various screens include an editing screen 10 described later (see FIG. 2).

The input interface 4 has one or more input devices, such as a keyboard and a pointing device, for receiving input operations for the information processing device 1 from the user. More specifically, the input interface 4 may be provided with a mouse, for example. The input interface 4 may also be provided with a touchscreen, for example. The touchscreen may be superposed over the entire or nearly the entire area of the display 3 in which images are displayed. When the input interface 4 is provided with a keyboard, the keyboard may be a type known as a hardware keyboard or a type known as a software keyboard (or on-screen virtual keyboard).

The communication interface 6 is configured to perform wired or wireless communications with a communication interface 105 of the printing device 101 according to a corresponding one of the communication methods described above. The communication interface 6 transmits the print commands described above.

The information processing device 1 may be in the form of a stationary personal computer such as a desktop computer, or a portable computer such as a laptop, tablet, or smartphone.

(1-3) Configuration of the Printing Device

As shown in FIG. 1, the printing device 101 is provided with a controller 102, a display 103, an input interface 104, a communication interface 105, and a print engine 106.

The controller 102 is provided with a CPU 102a, and a memory 102b. The memory 102b may have such semiconductor memory as ROM, RAM, NVRAM, or flash memory.

Computer programs, data, and the like for implementing the various functions of the printing device 101 are stored in nonvolatile memory of the memory 102b (e.g., flash memory). The CPU 102a performs overall control of the printing device 101 by functioning as a processor to implement processes in accordance with the computer programs stored in the memory 102b.

The display 103 displays various information for the user operating the printing device 101. The display 103 may be provided with one or more display devices including lamps and a liquid crystal display, for example.

The input interface 104 receives various input operations from the user. The input interface 104 may be provided with one or more input devices including pushbuttons, a keyboard, and a touchscreen, for example.

The communication interface 105 is configured to perform wired or wireless communications with the communication interface 6 of the information processing device 1 according to the communication method described above. The communication interface 105 receives the print commands described above.

The print engine 106 is a printing mechanism configured to print images on print media under control of the controller 102. When the printing device 101 receives a print command from the information processing device 1, the print engine 106 prints a label image based on the image data included in the print command on a print medium. The print engine 106 prints images using any of various printing methods such as thermal transfer, thermal, inkjet, and laser methods. In the present embodiment, the print engine 106 may be configured to print images on print media according to the thermal transfer method, for example.

In this embodiment, images are printed on the top surface of the print medium. An adhesive is applied to the back surface of the print medium and is covered with a release paper. Note that it is not necessary for the print medium to have adhesive. That is, the print medium may have any form that allows a label image to be printed thereon.

The print medium in the present embodiment is provided in a roll form, i.e., a form in which the print medium is wound into a roll. The print medium is housed in a cassette (not shown). The cassette is detachably mounted in the printing device 101. The print engine 106 prints label images on the print medium while drawing the print medium out of the cassette. The portion of the print medium on which the label image was printed is discharged from the printing device 101 through a discharge outlet (not shown) and is cut off automatically or manually.

When the controller 102 receives a print command via the communication interface 105, the controller 102 controls the print engine 106 to print a label image on the print medium while drawing the print medium out of the cassette, thereby creating a label for each label image.

(1-4) Creating a New Label Image with the Label Image Preparation Application

Figure 2:
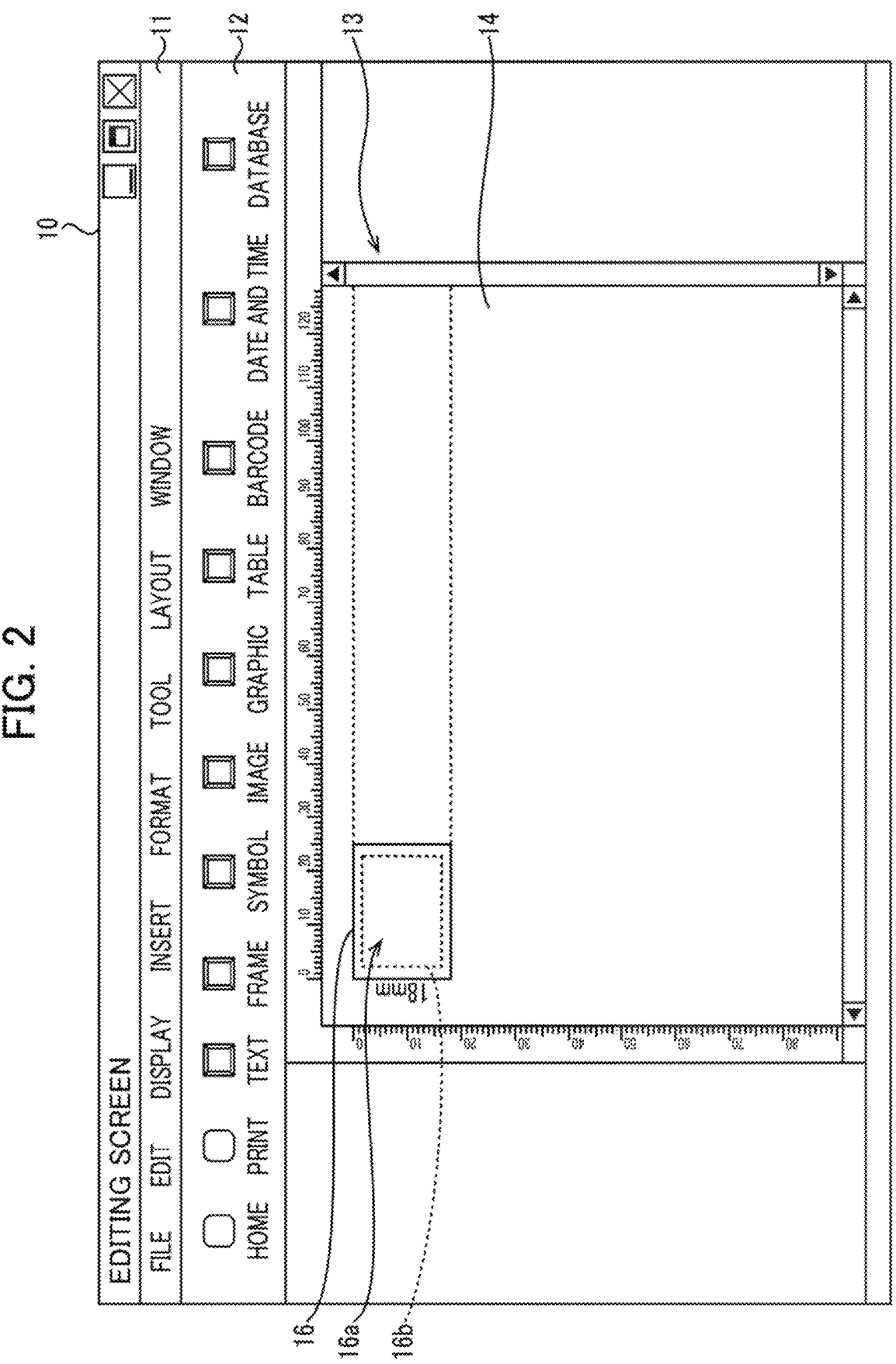
FIG. 2 is an explanatory diagram illustrating an editing screen in a first state.

When the user of the information processing device 1 starts up the label image preparation application 5a and performs a prescribed operation to initiate the creation of a new image, the label image preparation application 5a displays the editing screen 10 illustrated in FIG. 2 on the display 3. The editing screen 10 is a user interface for creating label images. The trigger for a process to create a new image includes an operation, input, or the like requesting that the editing screen 10 be displayed in its initial state. In the initial state of the editing screen 10, a label image has yet to be created. Therefore, when the trigger for a process to create a new image is issued, the editing screen 10 is displayed in the initial state shown in FIG. 2.

As shown in FIG. 2, the editing screen 10 includes a menu bar 11, a tool bar 12, and an editing area 13. The editing area 13 includes an image display area 14.

A label object 16 is displayed in the image display area 14. The label object 16 includes a label image object 16a representing a label image, and an input frame 16b defining the area in which this label image object 16a can be arranged.

The label image object 16a is a preview image of the label image, i.e., a virtual image showing how the label image will appear when printed on the print medium. The label object 16 is a preview image of the label image that includes an image of the print medium. The label object 16 shows how the label image will be laid out on the print medium. By viewing the label object 16, the user can visualize the label that will actually be generated. The input frame 16b is displayed along the outer edge of the label object 16.

Through the input interface 4, the user can perform various editing operations on the label object 16 to create the label image object 16a (i.e., to create a label image). The various editing operations include direct operations such as tapping and clicking inside the input frame 16b. Editing operations also include selectively specifying (e.g., clicking on) icons displayed in the tool bar 12 that are associated with editing functions.

As described above, the label image preparation application 5a has a plurality of editing functions for creating label images. In the present embodiment, the editing functions include a text insertion function, a frame insertion function, a symbol insertion function, an image insertion function, a graphic insertion function, a table insertion function, a barcode insertion function, a date and time insertion function, and a database reading function.

The text insertion function inserts text into the label image. The frame insertion function inserts a frame into the label image. The symbol insertion function inserts symbols into the label image. The image insertion function inserts a separately prepared image into the label image. The graphic insertion function inserts a graphic into the label image. The table insertion function inserts a table into the label image. The barcode insertion function inserts a barcode into the label image. The date and time insertion function inserts text specifying the current date and time into the label image. The database reading function reads a separately prepared database and inserts data contained in the database into the label image.

The user can apply these editing functions to the label image object 16a by selecting an icon in the tool bar 12 corresponding to the desired editing function. The user can then edit the label image object 16*a* using this editing function. For example, by selecting the icon corresponding to the function for inserting text, the user can insert text into the label image object 16*a* (and thus the label image). The created label image can then be printed on the printing device 101.

Here, the database reading function will be described in greater detail. The user can instruct the label image preparation application 5*a* to read a database through a prescribed read operation. This read operation may include operating the icon in the tool bar 12 associated with the database reading function.

Figure 3:
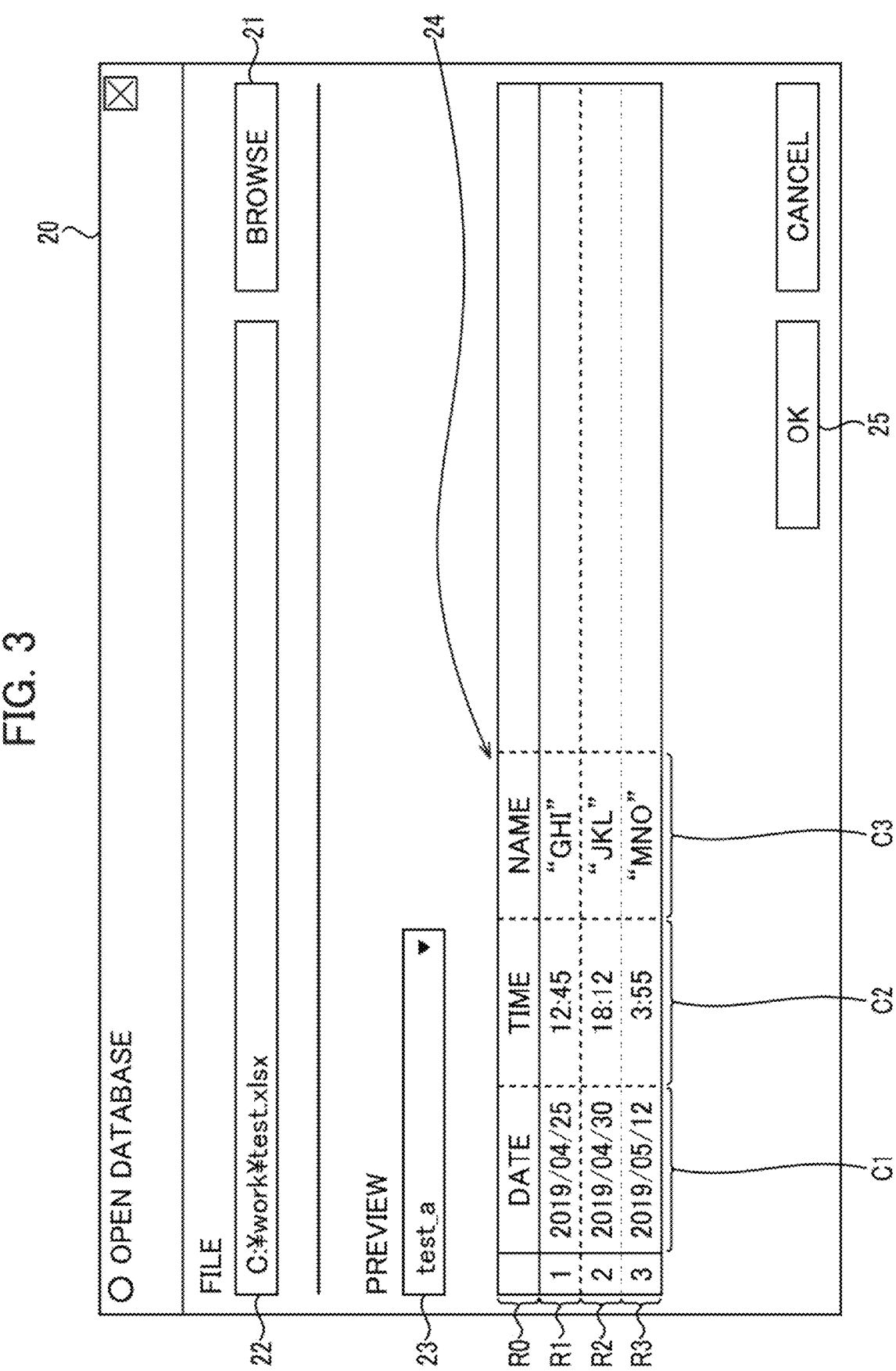
FIG. 3 is an explanatory diagram illustrating a database selection screen as a database open dialog.

When the user performs the read operation, the label image preparation application 5*a* displays a database selection screen 20 illustrated in FIG. 3 on the display 3. The database selection screen 20 may be displayed over the editing screen 10 (FIG. 2). The database selection screen 20 includes a Browse button 21, an address bar 22, a table name box 23, and an OK button 25.

When the Browse button 21 is operated, the label image preparation application 5*a* displays a database selection dialog (not shown) in which the user can select the database to be read. The database selection dialog lists the filenames or comparable images of the selectable databases. The user can select a database by choosing the desired database file in the database selection dialog.

Each database has one or more data tables. Each data table is also referred to as a data sheet (or simply a sheet). In the following description, data tables will be abbreviated as "tables". Each table includes a plurality of data fields that store data. A data field may also be referred to simply as a "field" or a "cell". Each data field includes text indicating the data (or values) stored in that data field.

Once the user has selected a database to be read, the label image preparation application 5*a* displays the file path for the selected database in the address bar 22. The label image preparation application 5*a* also displays a table image 24 in the database selection screen 20. The table image 24 is an image of one table in the selected database.

FIG. 3 shows an example in which a database having the filename "test.xlsx" was selected as the database to be read. In this example, the database has three tables, i.e., first through third tables. The name of the first table is "test_a"; the name of the second table is "test_b"; and the name of the third table is "test_c". The extension "xlsx" is the standard extension used with files in the spreadsheet software Excel (a U.S. registered trademark of Microsoft Corporation).

By operating the table name box 23, the user can select which table in the database to preview as the table image 24. In the example of FIG. 3, the first table "test_a" has been selected in the table name box 23 and, hence, the first table "test_a" is displayed as the table image 24.

The table has one or more columns, and one or more records (or rows). Each data field belongs to one column and record. Values (sets of data) in each record are associated with each other.

As illustrated in FIG. 3, the first table "test_a" has a first column C1, a second column C2, and a third column C3. The first table "test_a" also has a first record R1, a second record R2, and a third record R3. The first table "test_a" also has a top line R0. The top line R0 defines the name for each column. The top line R0 may also be used as a record.

Figure 4:
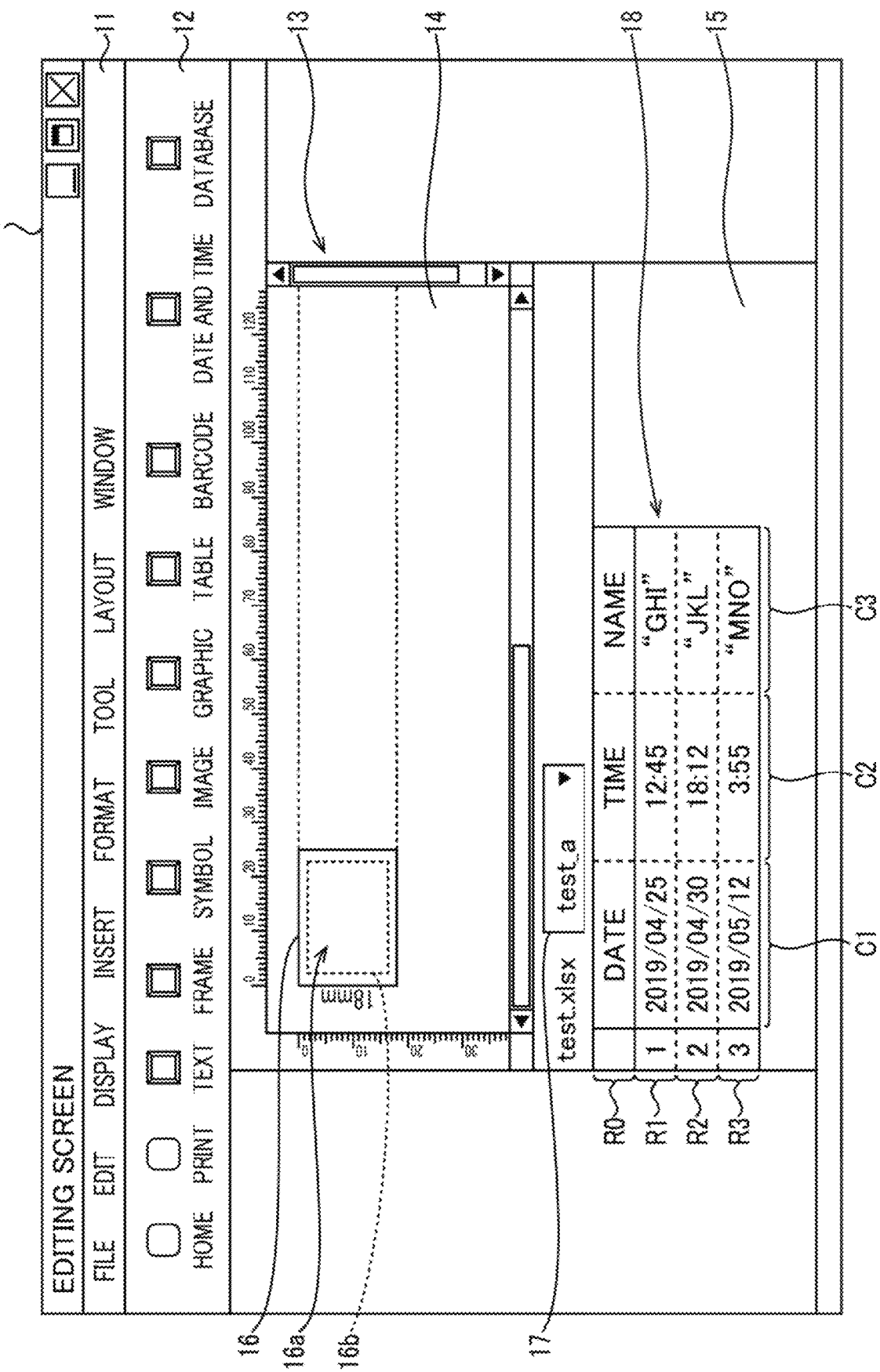
FIG. 4 is an explanatory diagram illustrating the editing screen in a second state.

When the OK button 25 is operated while one of the tables is selected in the table name box 23, the label image preparation application 5*a* imports the currently selected database that includes the selected table. The database selection screen 20 is then removed from the display to show the editing screen 10 with a table object 18 displayed therein, as illustrated in FIG. 4. The table object 18 is an image showing the selected table in the imported database.

After the database is imported, the editing area 13 of the editing screen 10 is divided into the image display area 14 and a database area 15. The table object 18 is displayed in the database area 15. At this time, a table box 17 is also displayed in the editing screen 10. By operating the table box 17, the user can switch the table displayed as the table object 18 to another table.

The user can add some or all of the sets of data from the imported database to the label image. In other words, for each set of data in the database, the user can add a data image specifying the set of data to the label image. In other words, the data image represents the contents of one or more sets of data (one or more data in the field) in the database. Below, the method of adding a data image to the label image will be described in detail with reference to FIG. 5.

Figure 5:
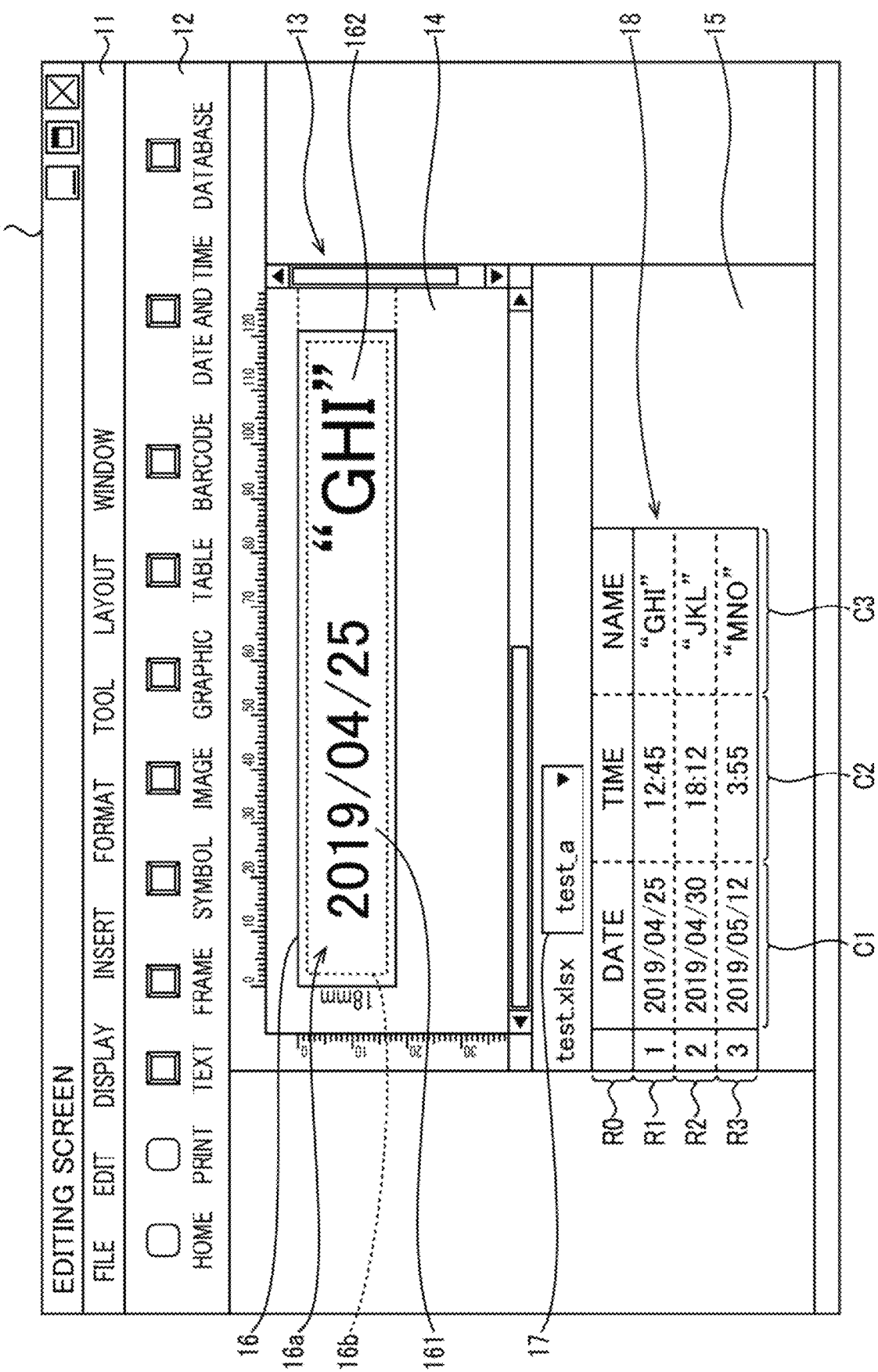
FIG. 5 is an explanatory diagram illustrating the editing screen in a third state.

In the following description, data fields in a table may be described using their corresponding column and record. For example, the data field belonging to the first column C1 and second record R2 may be called the "C1-R2 field". In the example of FIG. 5, data represented by the text "2019 Apr. 30" is stored in the C1-R2 field, for example. Similarly, data represented by the text "GHI" is stored in the C3-R1 field, for example.

The label image preparation application 5*a* accepts merge operations performed by the user. A merge operation is a request to insert data from the table shown by the table object 18 into the label object 16. In the present embodiment, the merge operation includes a drag-and-drop operation for dragging a data field showing data the user wishes to add to the label image from the table object 18 and dropping the data field in the label object 16.

As an example, when the user performs a merge operation to insert the C1-R1 field into the label object 16, a data image object 161 representing the data image in the C1-R1 field is added to the label image object 16*a*, as illustrated in FIG. 5. This operation generates a label image to which the data image has been added.

As another example, when the user performs a merge operation to insert the C3-R1 field into the label object 16, a data image object 162 specifying the data image in the C3-R1 field is added to the label image object 16*a*, as illustrated in FIG. 5.

In addition to merge operations performed in units of data fields, the user can also perform merge operations in units of columns. For example, by performing a merge operation to merge a specific column name in the top line R0 into the label object 16, all data included in the corresponding column can be added to the label image at the same time.

Here, the various information and the like that the storage 5 develops in the memory 200*b* will be described. The label image preparation application 5*a* performs various processes using the memory 200*b*, such as the creation of a label image described above and the saving of a label image described below.

That is, upon startup, the label image preparation application 5*a* allocates a working storage area 60 in the memory 200*b* (hereinafter called a "work area"; see FIG. 11). The label image preparation application 5*a* then reads various programs, data, and the like into a work area 60 to perform various processes. The work area 60 may be set in any manner in the memory 200*b*. Further, the work area 60 may be allocated in the storage 5 or may be allocated in another storage medium when such a storage medium is provided in addition to the memory 200*b* and the storage 5.

When a label image is created in the editing screen 10, the label image preparation application 5a writes LBX information 62 (see FIG. 11) to the work area 60. The LBX information 62 is information specifying the content of the label image being created. That is, the LBX information 62 includes information such as what objects are arranged where and in what form in the label image. The LBX information 62 is updated as the user edits the label image. In other words, the LBX information 62 is information that enables the CPU 200a to reproduce the currently edited label image. That is, the LBX information 62 is used by the CPU 200a when the label image is rendered. The LBX information 62 may include base image data representing a base image on which the data images are added. The base image may be a background image of the label and/or may be a blank image.

When a database is read in the editing screen 10, the label image preparation application 5a also writes this database to the work area 60 as a database 63 (see FIG. 11).

When a merge operation is performed in the editing screen 10, the label image preparation application 5a links the database 63 to the LBX information 62. Specifically, the label image preparation application 5a adds a first database path and data image information to the LBX information 62.

The first database path is the file path of the original database from which the database 63 was read. For example, when the original database, from which the database 63 has been read, has the filename "test" and is stored in the folder "C:/work", the first database path "C:/work/test" is added to the LBX information 62.

The data image information includes link information specifying the location of the merged data. The link information specifies, for each set of merged data, the database in which the set of data is included, the data field of that table in which the set of data is located, and formatting information (e.g., size, font, etc.) for the data image when the set of data is incorporated into the label image. When the database includes a plurality of data tables, the link information further specifies, for each set of merged data, the table to which the set of data belongs.

(1-5) Saving a New Label Image (1-5-1) Overview of the Saving Process

Figure 6:
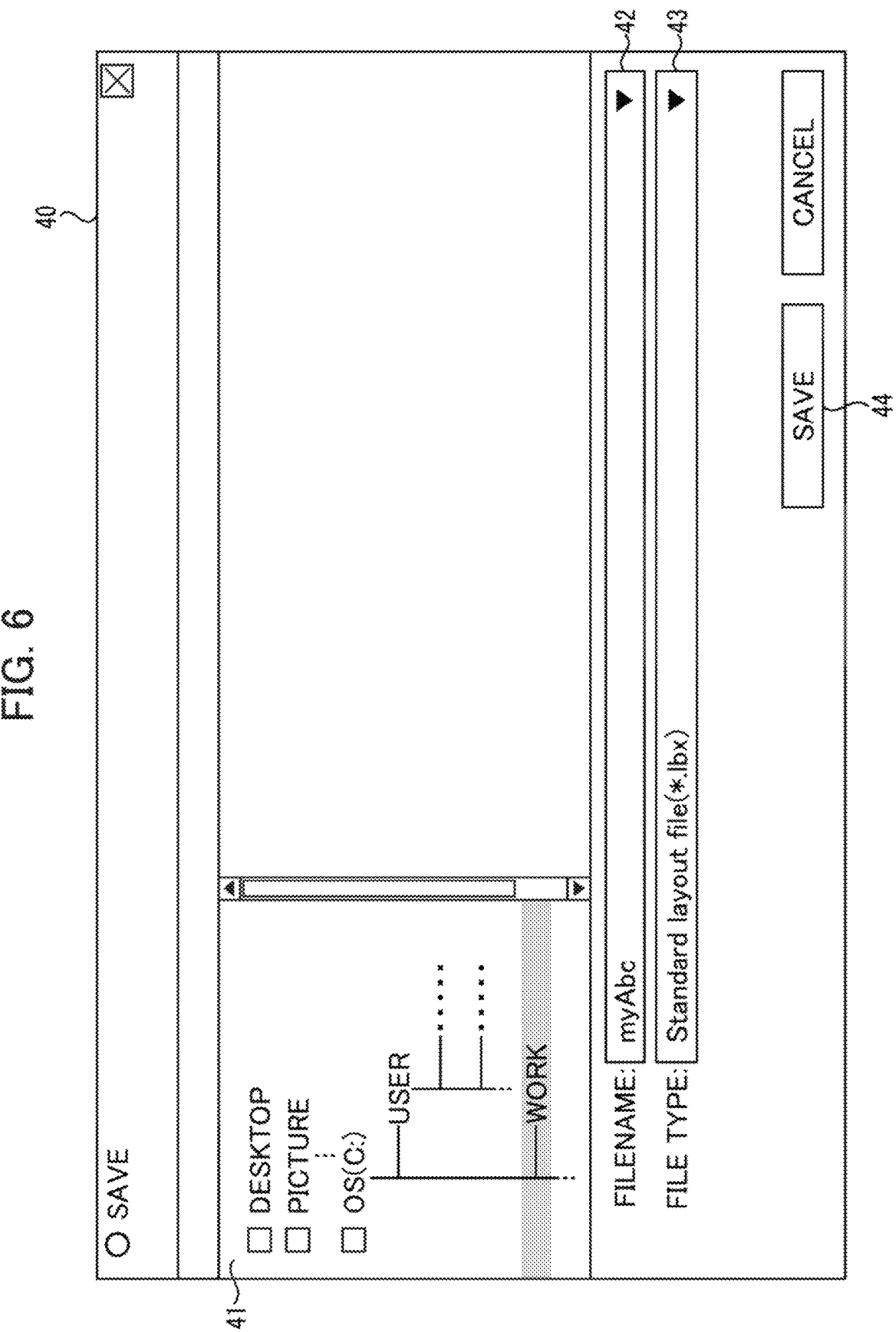
FIG. 6 is an explanatory diagram illustrating a file saving dialog in a first state.

The user can save the newly created label image as a file with a user-assigned filename. Next, the process of saving the label image will be described. The label image preparation application 5a receives a request from the user to save a new label image. The new save request may be issued in any way. For example, a new save request in the present embodiment involves inputting various settings in a file saving dialog 40 illustrated in FIG. 6 and operating a Save button 44.

When the user performs an operation in the editing screen 10 to display the file saving dialog 40, the label image preparation application 5a displays the file saving dialog 40 on the display 3. The file saving dialog 40 includes a navigation pane 41, a filename box 42, a file type box 43, and the Save button 44.

The navigation pane 41 displays a folder tree managed by the OS. Through operations in the navigation pane 41, the user can specify a destination folder for saving the label image. The label image preparation application 5a saves the label image in the specified folder.

The user can input a filename for the label image in the filename box 42. The label image preparation application 5a sets the filename of the file being saved to the filename inputted by the user.

Figure 7:
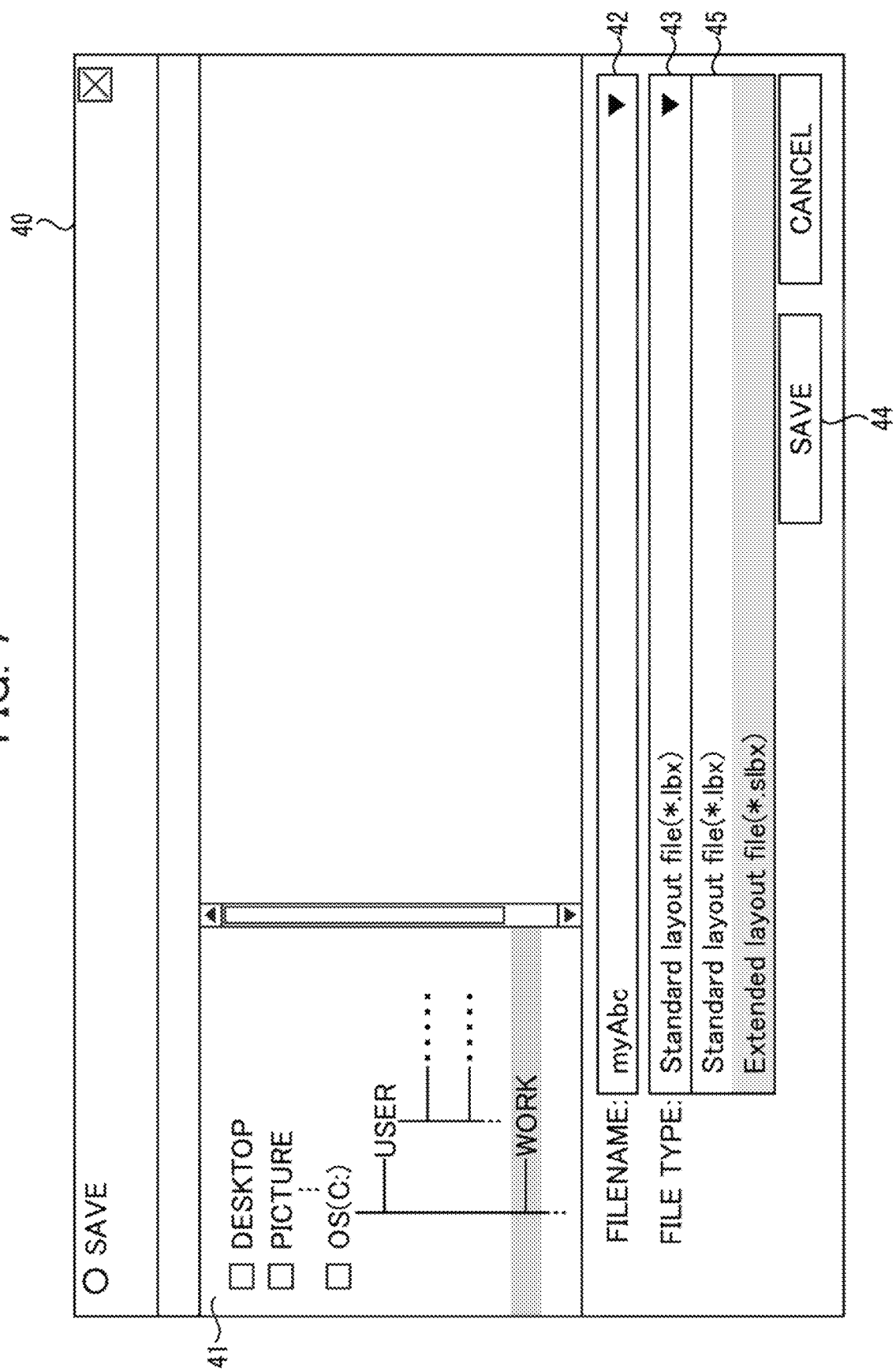
FIG. 7 is an explanatory diagram illustrating the file saving dialog in a second state.

The user can also specify the file format in the file type box 43 so that the label is to be saved in the specified file format. Specifically, as illustrated in FIG. 7, the user operates the file type box 43 to display a pull-down menu 45 listing all selectable file formats. Through a selection in the pull-down menu 45, the user can specify a desired file format. The label image preparation application 5a then saves the label image in the specified file format.

In the present embodiment, the label image created in the editing screen 10 can be saved in one of two file formats: the LBX format and the SLBX format.

Figure 8:
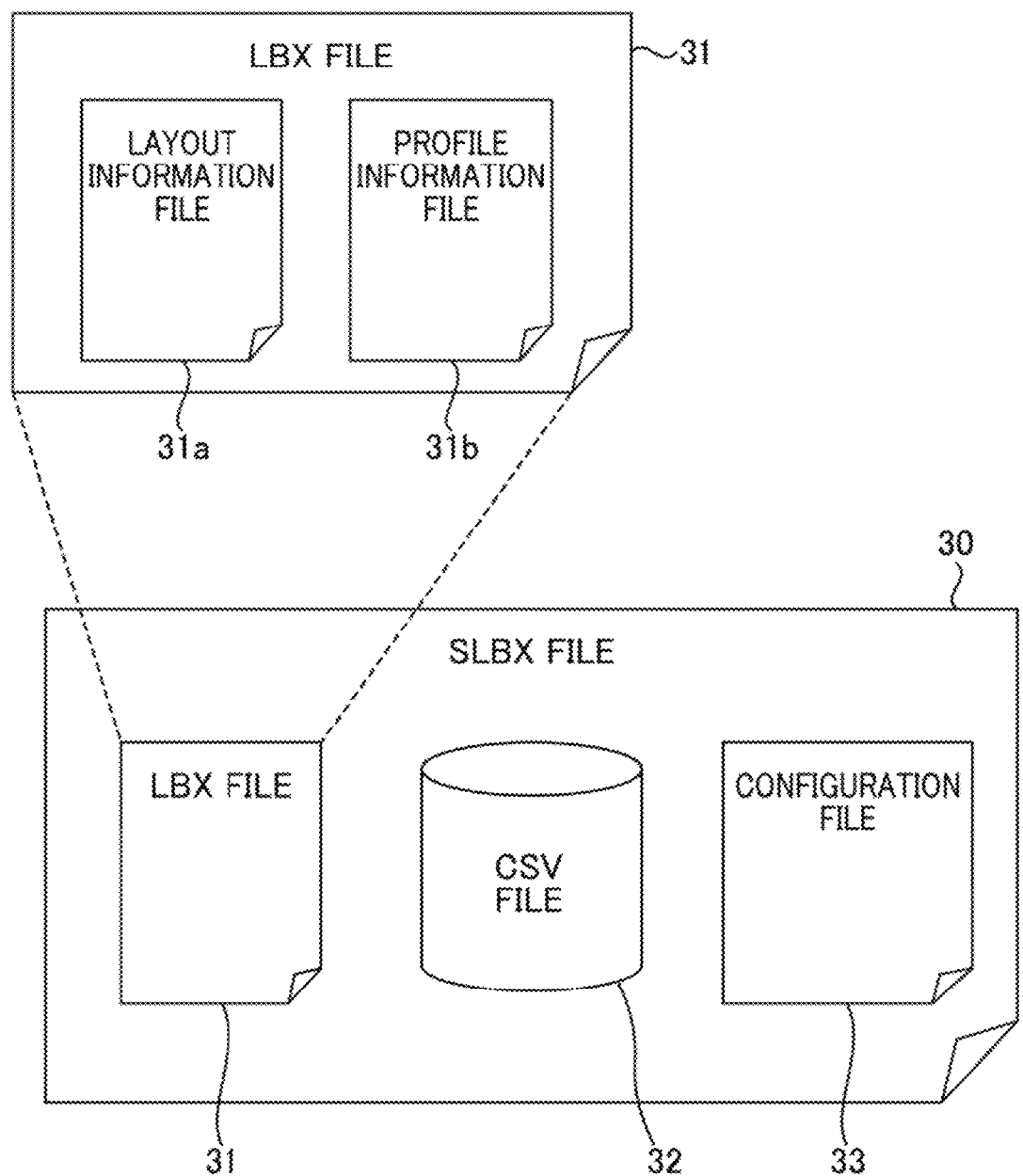
FIG. 8 is an explanatory diagram illustrating a structure of a SLBX file.

FIG. 8 schematically illustrates an LBX file 31 having the LBX file format, and an SLBX file 30 having the SLBX file format.

The LBX file 31 includes a layout information file 31a, and a profile information file 31b. The LBX file 31 is generated by compressing the layout information file 31a and the profile information file 31b. The layout information file 31a and the profile information file 31b may be in any file format. In the present embodiment, the layout information file 31a and the profile information file 31b are in the XML format. XML stands for "Extensible Markup Language"

The LBX information 62 (see FIG. 11) described above is included in the layout information file 31a, for example. Because the LBX information 62 includes the first database path and the link information, the first database path and the link information are also included in the layout information file 31a. The information such as what objects are arranged where in the label image may be included in the layout information 31a. Note that partial information of the LBX information 62 may be included in a file other than the layout information file 31a. For example, the profile information 31b may include information included in the LBX information 62 such as information about what objects are arranged in what form in the label image. The layout information 31a or the profile information 31b may include the data image information included in the LBX information 62.

The LBX format may be described as a file format in which the layout information file 31a and profile information file 31b have been compressed. In other words, the LBX format may be considered a format in which the LBX information 62 is filed independently from the database. The LBX file 31 has the extension "lbx" in the present embodiment.

The SLBX file 30 includes the LBX file 31 described above. In addition to the LBX file 31, the SLBX file 30 also includes a CSV file 32, and a configuration file 33. "CSV" is an abbreviation for "comma-separated values".

The CSV file 32 contains data based on a specific data table. Th specific data table is one data table among one or more data tables included in the database. More specifically, the specific data table is a data table from which data is inserted into the label object 16 in the merge operation. In other words, the specific data table is a data table containing data incorporated into the label image that is in preparation. For simplicity, it is assumed in this example that the user selects one data table, the data in the selected data table is incorporated in to the label image, and a file for this label image is to be generated and saved. On this assumption, the data table selected by the user is the specific data table. The specific data table is saved as the CSV file 32 in the CSV file format.

In the example of FIGS. 3 through 5, the imported database has the standard file format used in Excel, i.e., a file with the extension "xlsx". Further, the first table "test a" is selected from among the plurality of data tables, and data therein is incorporated in the label image. When the created label image is saved in the SLBX format, the table "test a" included in the SLBX file to be saved. In this case, the table "test_a" is converted to the file in the CSV format.

As is well-known, the CSV format is a universal (i.e., widely supported) file format that can be used by many different applications. The CSV file format has the extension "csv".

The configuration file 33 contains SLBX configuration data 61 described later (see FIG. 14). The configuration file 33 may have any file format. In the example of the present embodiment, the configuration file 33 is saved in the JSON file format, where "JSON" is an abbreviation for "JavaScript Object Notation".

The SLBX file 30 includes the LBX file 31, the CSV file 32, and the configuration file 33 integrated into a single file. That is, the SLBX file 30 is generated by compressing the LBX file 31, the CSV file 32, and the configuration file 33 according to a prescribed compression format. The ZIP file format is used as the prescribed compression format in the present embodiment.

The SLBX format can be considered a file format in which the LBX file 31, the CSV file 32, and the configuration file 33 have been compressed according to the prescribed compression format. In other words, the SLBX format may be viewed as a format in which the LBX information 62 has been integrated (and specifically compressed in this embodiment) into a single file together with a database. That is, the SLBX format is a container format that defines a container file integrating (or containing) a plurality of files. Here, the LBX format is not the container format, thus the LBX format does not allows definition of such a container file.

The standard extension for files compressed in the ZIP format is "zip". Therefore, the standard extension "zip" may also be used as the extension of the SLBX file 30. However, a prescribed extension different from the standard extension of the ZIP format is used as the extension of the SLBX file 30 in the present embodiment. The prescribed extension in this example is "slbx". This extension "slbx" may be set during the process of generating the SLBX file, or the "zip" extension may be provisionally set for the SLBX file 30, and thereafter changed to the "slbx" extension after the SLBX file 30 has been generated.

FIG. 7 shows an example in which "C:/work" has been specified as the destination folder, "myAbc" has been designated as the filename for the file being saved, and the "SLBX format" is in the process of being selected as the file format.

(1-5-2) Process of Saving a New File

Figure 9:
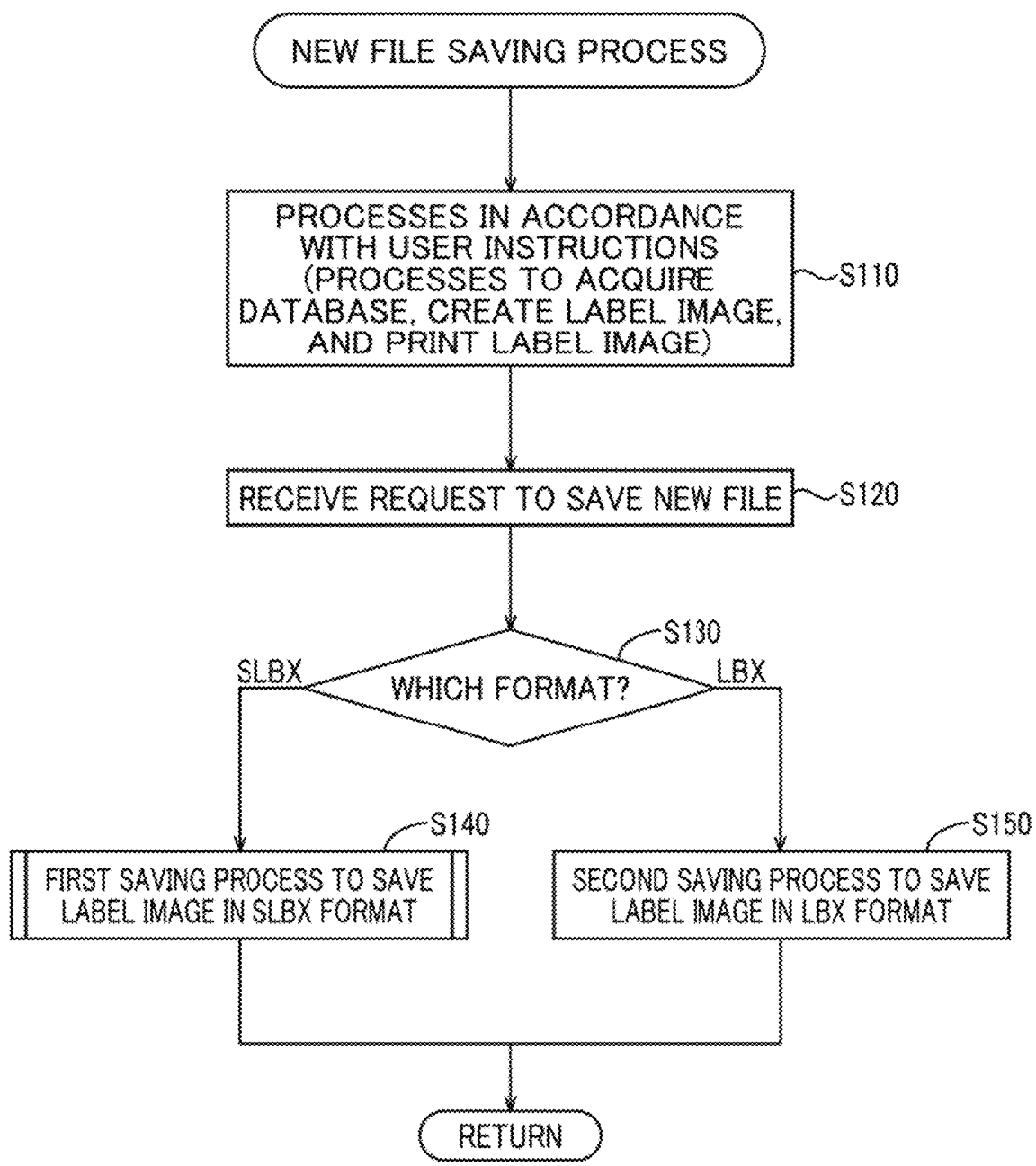
FIG. 9 is a flowchart illustrating a process for saving a new file.

Next, a process for saving a new file will be described with reference to the flowchart in FIG. 9. The controller 2 executes this process in accordance with the label image preparation application 5a in order to save the label image described above. For convenience of description, the process for saving a new file in FIG. 9 will include the process of creating a label image. The process for saving a new file is implemented by the controller 2 executing a corresponding program module in the label image preparation application 5a.

The process for saving a new file is started in response to the editing screen 10 being displayed on the display 3 in its initial state, as illustrated in FIG. 2.

In S110 at the beginning of the new file saving process, the controller 2 performs various processes in accordance with user instructions. The various processes performed at this time include a process to acquire a database (see FIGS. 3 and 4), a process to create a label image via the label image object 16a (see FIGS. 4 and 5), and a process to control the printing device 101 to print the created label image. The creation of a label image includes editing the label image by adding data images for data in the database to the label image (see FIG. 5). At this time, the controller 2 also writes the LBX information 62 to the work area 60 (see FIG. 11). When a database is imported, the database is also written to the work area 60 (see FIG. 11). The database written to the work area will hereinafter be referred to as the "database 63" (see FIG. 11)

In S120 the controller 2 receives a request from the user to save a new file. As described above, this new file saving request is received via the file saving dialog 40 (see FIGS. 6 and 7). Upon receiving the new file saving request, in S130 the controller 2 determines the file format that has been specified for the file to be saved.

When the SLBX format was specified (S130: SLBX), in S140 the controller 2 executes a first saving process. The first saving process is performed for saving the created label image in the SLBX format as an SLBX file 30.

When the user specified the LBX format (S130: LBX), in S150 the controller 2 executes a second saving process. The second saving process is performed for saving the created label image in the LBX format as an LBX file 31. In this case, an SLBX file 30 is not generated even when a database has been imported.

Figure 10:
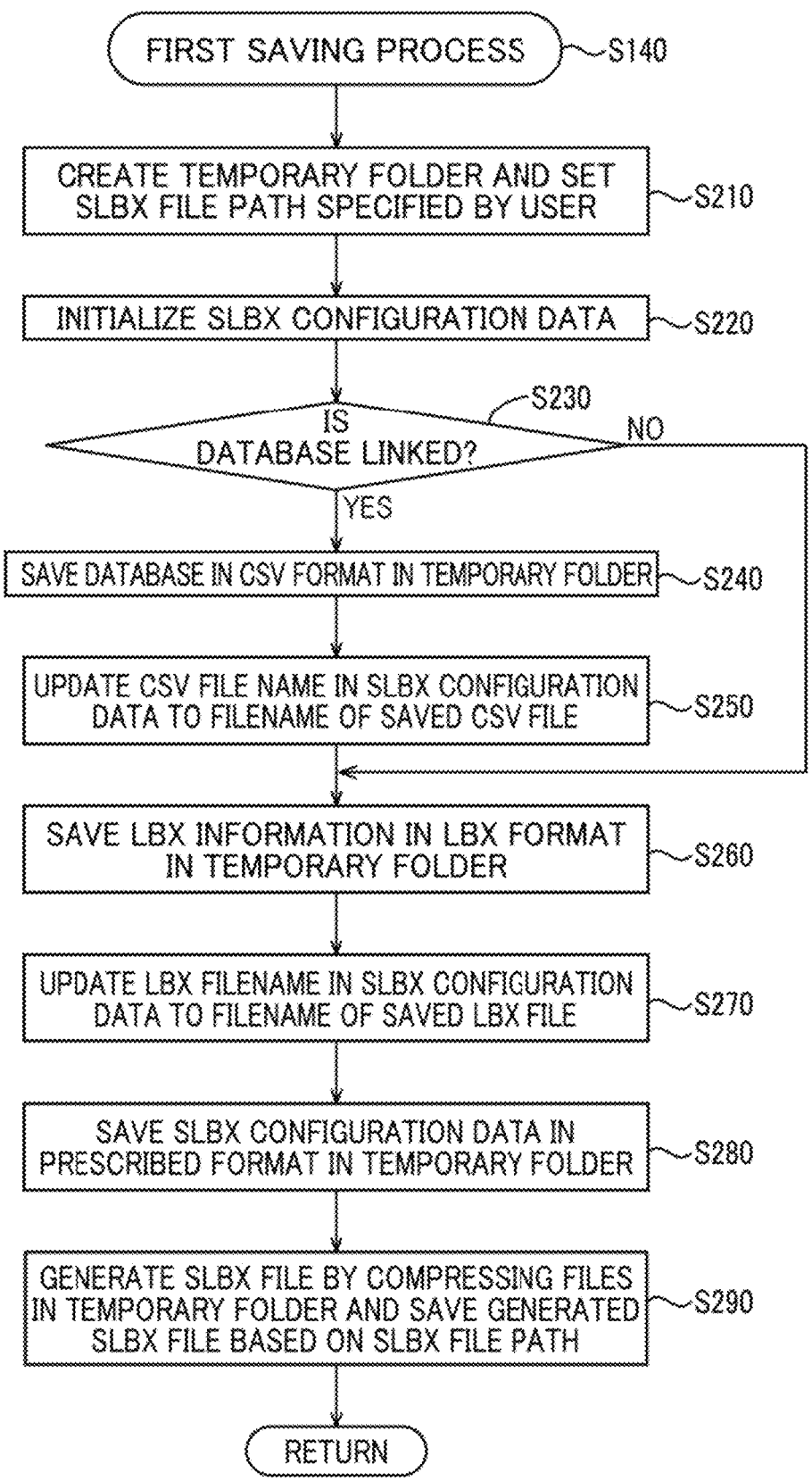
FIG. 10 is a flowchart illustrating a first saving process.

FIG. 10 shows steps in the first saving process of S140. When proceeding to the first saving process, as shown in 1*a* in FIG. 11, in S210 the controller 2 creates a temporary folder 70 in the storage 5 (for example). At this time, the controller 2 writes SLBX configuration data 61 and an SLBX file path 64 to the work area 60. However, values in the SLBX configuration data 61 are undefined at this point in time.

The SLBX file path 64 specifies the file path for saving the SLBX file 30. The location of the folder for saving the file and the filename that the user specified in the file saving dialog 40 (see FIG. 6) are written to the SLBX file path 64.

The SLBX configuration data 61 includes data (or values) related to the SLBX file 30. Specifically, the SLBX configuration data 61 includes an LBX filename and a CSV filename. The LBX filename is the name for the LBX file 31 to be saved. The CSV filename is the filename for the CSV file 32 to be saved.

In the SLBX configuration data 61 shown in FIG. 11, "CurrentLbx" indicates the LBX filename and "CurrentCsv" indicates the CSV filename. In the example of FIG. 11, "myAbc" is specified by the user as the filename for the file to be saved and "C:/work/my Abc.slbx" is specified by the user as the file path for saving the file.

The temporary folder 70 is temporarily used for generating the SLBX file 30. In the present embodiment, the temporary folder 70 differs from the destination folder specified by the user for saving the SLBX file 30. More specifically, the temporary folder 70 in the present embodiment is created in a folder managed by the OS and referred to as a hidden folder. FIG. 11 shows an example of a temporary folder 70 created as "C:/Users/user.name/AppData/Local/Temp/pteslbx/AAAAAA".

As shown in 1*b* in FIG. 11, in S220 the controller 2 initializes the SLBX configuration data 61. Specifically, the controller 2 sets the LBX filename and the CSV filename to initial values (e.g., null values).

In S230 the controller 2 determines whether a database 63 is linked to the LBX information 62, i.e., whether the label image to be saved contains data images. When a database 63 is not linked to the LBX information 62 (S230: NO), the controller 2 advances to S260. When a database 63 is linked to the LBX information 62 (S230: YES), the controller 2 advances to S240.

As shown in 1c in FIG. 12, in S240 the controller 2 generates the CSV file 32 and saves the generated CSV file 32 in the temporary folder 70. In other words, the controller 2 saves the linked database 63, as a file in the CSV format, in the temporary folder 70. More specifically, the controller 2 saves the data table included in in the linked database 63 in the temporary folder 70. Here, the saved data table is a data table to which the data incorporated into the label image belongs. The filename for the CSV file 32 may be determined in anyway. In the present embodiment, the filename of the CSV file 32 is given the name of the corresponding table.

As shown in 1d in FIG. 12, in S250 the controller 2 updates the CSV file name in the SLBX configuration data 61 to the filename of the CSV file 32 that was saved in S240.

As shown in 1e in FIG. 13, in S260 the controller 2 generates the LBX file 31 on the basis of the LBX information 62 and saves the LBX file 31 in the temporary folder 70. In other words, the LBX information 62 is saved in the temporary folder 70 as an LBX file 31 in the LBX format. The filename of the LBX file 31 is set to the filename specified by the user in the new file saving request. In this example, the filename is "myAbc" (see FIG. 6).

As shown in If in FIG. 13, in S270 the controller 2 updates the LBX filename in the SLBX configuration data 61 to the filename of the LBX file 31 saved in S260.

As shown in 1g in FIG. 14, in S280 the controller 2 generates the configuration file 33 on the basis of the SLBX configuration data 61, and saves the configuration file 33 in the temporary folder 70. In other words, the SLBX configuration data 61 is saved in the temporary folder 70 as the configuration file 33 in a prescribed file format (the JSON format in this embodiment). The filename for the configuration file 33 may be determined in any way. For example, the filename for the configuration file 33 may be predetermined.

As shown in 1h in FIG. 14, in S290 the controller 2 compresses the LBX file 31, the CSV file 32, and the configuration file 33 saved in the temporary folder 70 according to a prescribed compression format to generate the SLBX file 30. The controller 2 then saves the generated SLBX file 30 at the file path indicated by the SLBX file path 64, i.e., the file path specified by the user as the saving destination (see 1h in FIG. 14).

Through this process, the label image is saved. Note that a label image can be saved in the SLBX format even when a database was not imported during the creation of the label image. However, in such cases, the SLBX file 30 will not include CSV file 32, and the CSV filename in the SLBX configuration data 61 will not be changed from its initial value.

(1-6) Process for Opening a Label File
(1-6-1) Overview of the Process

Next, a process for opening a saved label file will be described. A label file in this case is a general term for an SLBX file 30 saved in the SLBX format and an LBX file 31 saved in the LBX format.

For example, the user can specify a label file and issue a request to open the label file (hereinafter called an "open request") in order to open and display the label file in the editing screen 10 (FIG. 4). The open request may be issued according to any procedure. For example, the user may issue the open request in a file open dialog 50 illustrated in FIG. 15. In the present embodiment, an open request includes operations to select a label file and to press a button 55 in the file open dialog 50, as will be described below. The file open dialog 50 may be displayed according to any procedure. For example, the file open dialog 50 can be displayed from the editing screen 10.

Figure 15:
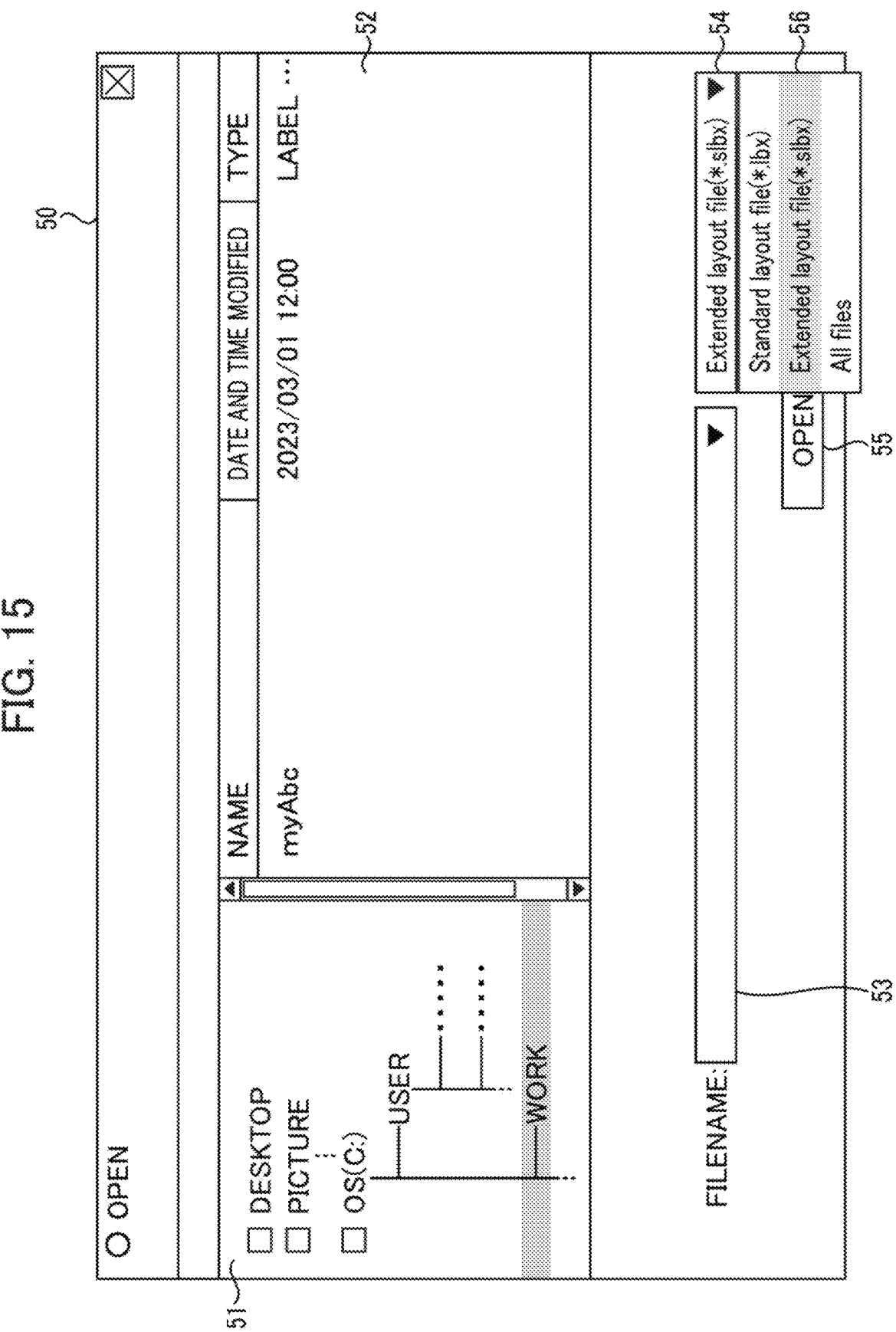
FIG. 15 is an explanatory diagram illustrating a file open dialog.

As shown in FIG. 15, the file open dialog 50 includes a navigation pane 51, a file list 52, a filename box 53, a file type box 54, and an Open button 55.

The navigation pane 51 displays a file tree managed by the OS. By operating the navigation pane 51, the user can select the folder containing a label file that the user wishes to open. The file list 52 displays some or all of the files stored in the folder selected in the navigation pane 51.

The user can specify the file format of files to be displayed in the file list 52 via the file type box 54. When the file type box 54 is operated, a pull-down menu 56 listing the selectable file formats is displayed, as illustrated in FIG. 15. In the pull-down menu 56 of the example in FIG. 15, "Extended layout file" denotes the SLBX format and "Standard layout file" denotes the LBX format. The user can specify the file format of files to be displayed in the file list 52 by selecting the desired file format in the pull-down menu 56.

The user can then select a label file to open from the file list 52. When a label file has been selected in the file list 52, the filename of the selected label file is displayed in the filename box 53. When the user operates the Open button 55 while a filename is selected, a file opening process is initiated to open the selected label file. In the following description, the selected label file will be called the "open target file".

(1-6-2) File Opening Process

Figure 16:
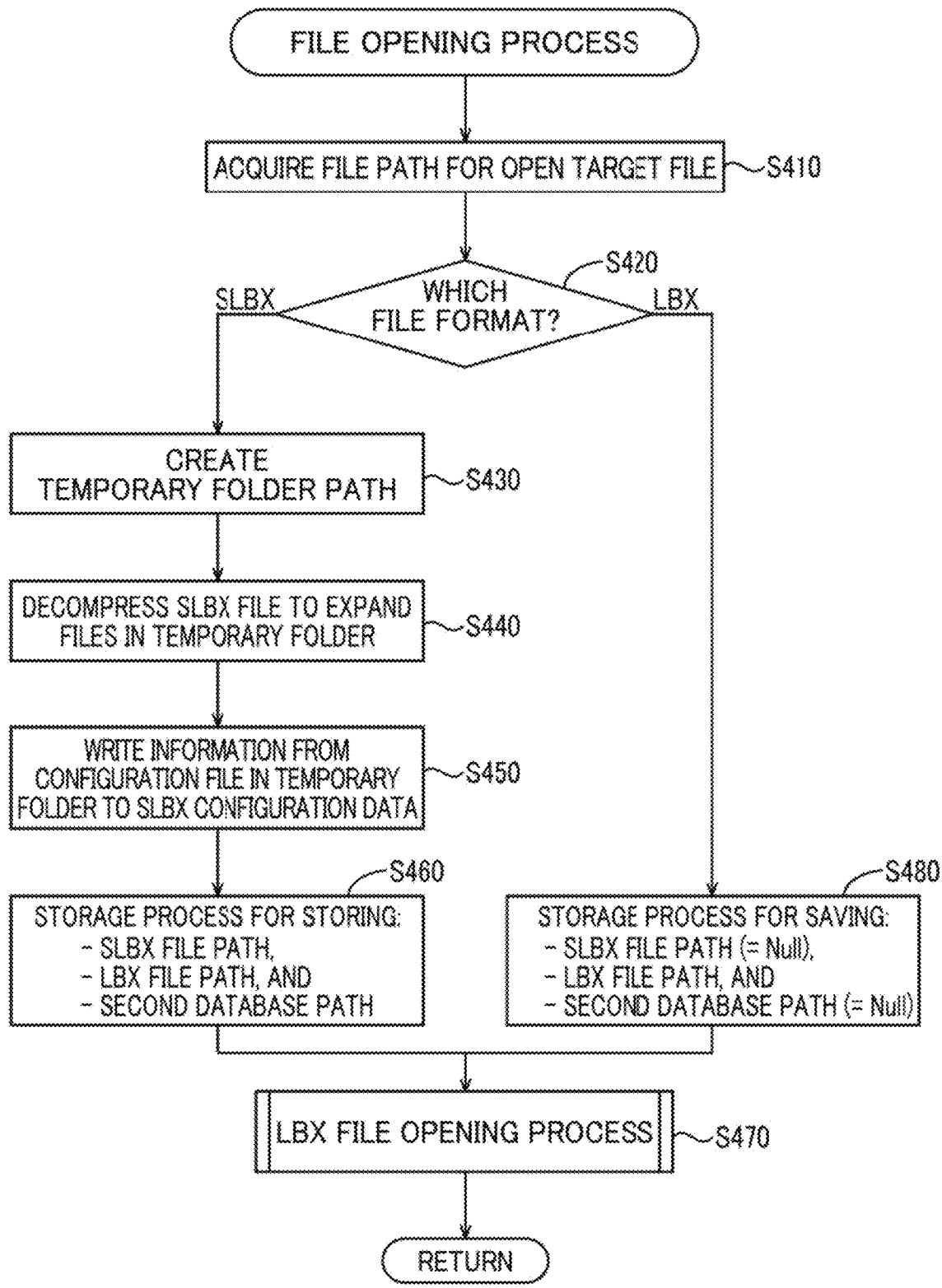
FIG. 16 is a flowchart illustrating a file opening process.

FIG. 16 shows steps in the file opening process. The file opening process is implemented by the controller 2 executing a corresponding program module in the label image preparation application 5a. The following example will assume that the open target file is an SLBX file 30 having the filename "myAbc.slbx" saved in the folder "C:/work".

In S410 at the beginning of the file opening process, the controller 2 acquires the file path for the open target file. The controller 2 then writes the acquired file path to a work area 80. The work area 80 may be set in any manner in the memory 200b. Specifically, as shown in 2a in FIG. 18, the controller 2 writes a user-specified file path 81 to the work area 80. The user-specified file path 81 specifies the location of the open target file (or, the file path for the open target file).

The controller 2 also writes an SLBX file path 82, an LBX file path 83, SLBX configuration data 84, and a second database path 85 to the work area 80. However, the values of the SLBX file path 82, LBX file path 83, SLBX configuration data 84, and second database path 85 are all undefined at this time.

The value of the user-specified file path 81 is written to the SLBX file path 82 in a process described later. The file path for the LBX file 31 included in the open target file is later written to the LBX file path 83.

When the open target file is an SLBX file 30, data related to the SLBX file 30 is later written to the SLBX configuration data 84. The data written to the SLBX configuration data 84 is identical to the data in the SLBX configuration data 61 generated when the open target file was saved. In other words, the SLBX configuration data 61 generated when saving the file is reproduced as the SLBX configuration data 84 in a decompression process described later. The LBX filename in the SLBX configuration data 84 and the database file name respectively specify the filename of the LBX file 31 and the file name of the CSV file 32 extracted through decompression. The file path for the CSV file obtained through decompression is later written to the second database path 85.

In S420 the controller 2 determines the file format for the open target file. When the open target file is in the SLBX format (i.e., an SLBX file 30; S420: SLBX), as shown in 2*b* in FIG. 18, in S430 the controller 2 creates a temporary folder path 86 in the work area 80. The temporary folder path 86 is the path to a temporary folder 90 (see FIG. 19) that is temporarily used to decompress the SLBX file 30 to be opened. The temporary folder 90 may be established anywhere, that is, the temporary folder path 86 may specify any location. For example, the temporary folder 90 may be created in the storage 5. In the present embodiment, the temporary folder 90 is the same as the temporary folder 70 created when the file was saved.

In S440 the controller 2 writes the SLBX file 30, which is the open target file, to the temporary folder 90 specified by the temporary folder path 86. Next, as shown in 2*c* in FIG. 19, in S440 the controller 2 decompresses the SLBX file 30 in the temporary folder 90. This results in the LBX file 31, the CSV file 32, and the configuration file 33 contained in the SLBX file 30 being individually saved in the temporary folder 90.

As shown in 2*d* in FIG. 19, in S450 the controller 2 writes information from the configuration file 33 decompressed in the temporary folder 90 to the SLBX configuration data 84 in the work area 80. Specifically, the controller 2 writes the file name of the decompressed LBX file 31 and the file name of the decompressed CSV file 31 to the SLBX configuration data 84.

Figure 20:
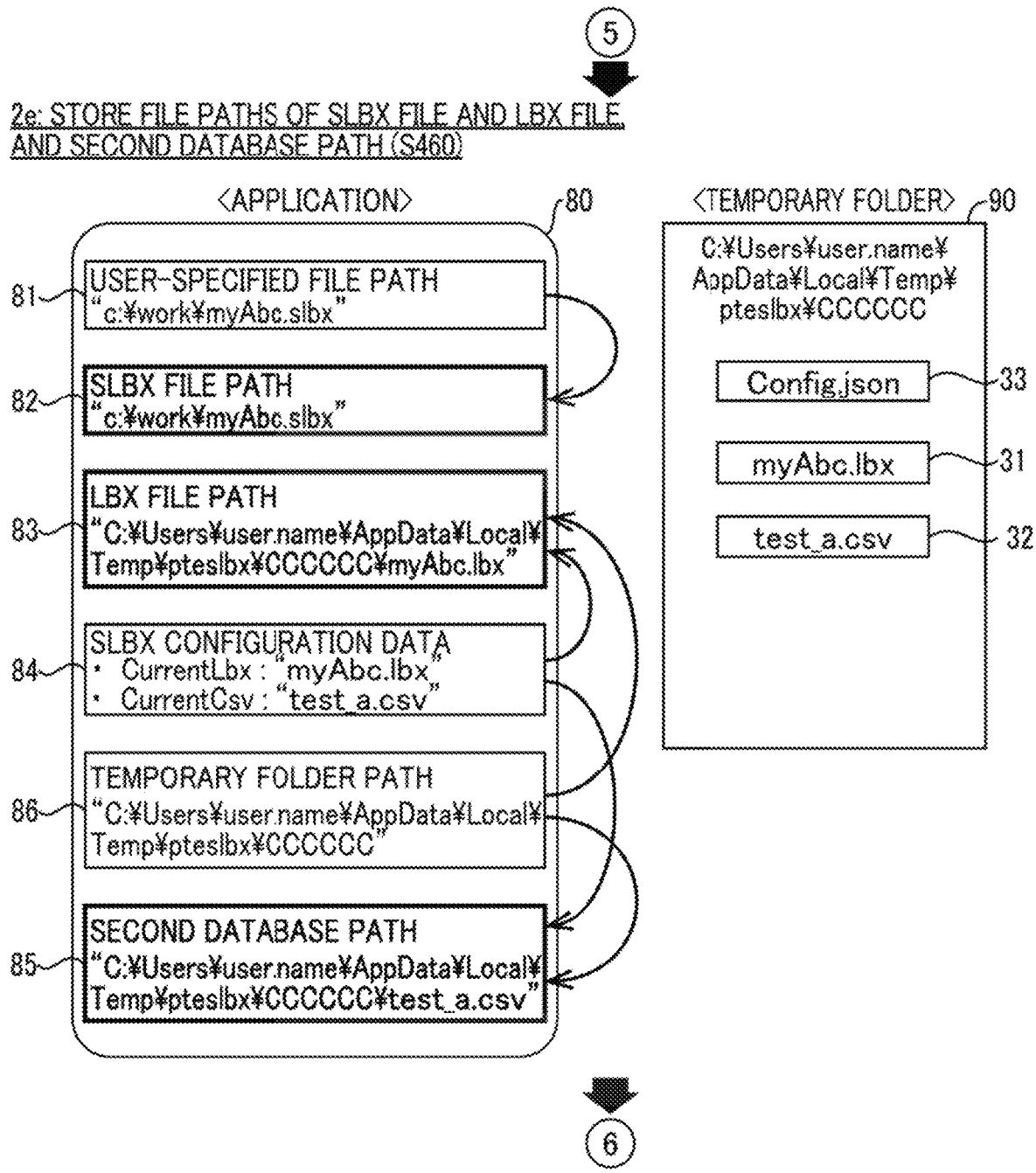
FIG. 20 is a schematic diagram illustrating a step in the LBX file opening process following the steps of FIG. 19.

As shown in 2*e* in FIG. 20, in S460 the controller 2 performs a storage process. Specifically, the controller 2 writes the file path set in the user-specified file path 81 to the SLBX file path 82. Further, the controller 2 references the temporary folder path 86 and the SLBX configuration data 84 and writes the file path for the LBX file 31 decompressed in the temporary folder 90 to the LBX file path 83. Further, the controller 2 references the temporary folder path 86 and the SLBX configuration data 84 and writes the file path for the CSV file 32 decompressed in the temporary folder 90 to the second database path 85. After completing the storage process of S460, the controller 2 advances to S470.

When the file format for the open target file is determined in S420 to be the LBX format (S420: LBX), in S480 the controller 2 executes a storage process corresponding to the LBX format. Specifically, the controller 2 sets the values of the SLBX file path 82 and the second database path 85 to the null value. The controller 2 also writes the file path for the LBX file 31, which is the open target file, to the LBX file path 83. After completing the storage process of S480, the controller 2 advances to S470.

Figure 17:
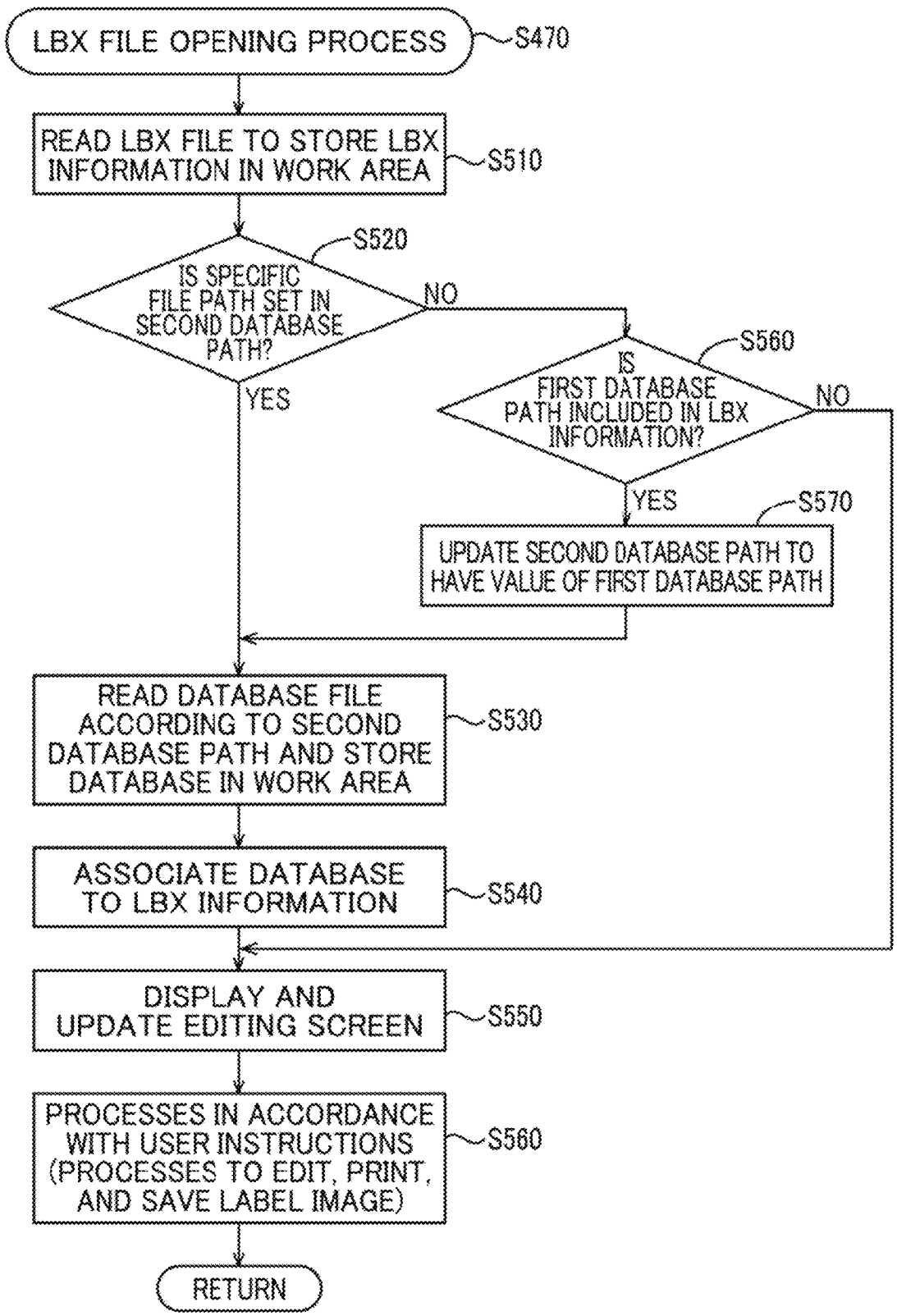
FIG. 17 is a flowchart illustrating an LBX file opening process.

In S470 the controller 2 executes an LBX file opening process. This process is performed to open the LBX file 31 saved at the file path specified by the LBX file path 83. In other words, the LBX file opening process is performed to display the label image on the editing screen 10 on the basis of the LBX file 31, allowing the user to edit or print the label image. FIG. 17 shows steps in the LBX file opening process.

Figure 21:
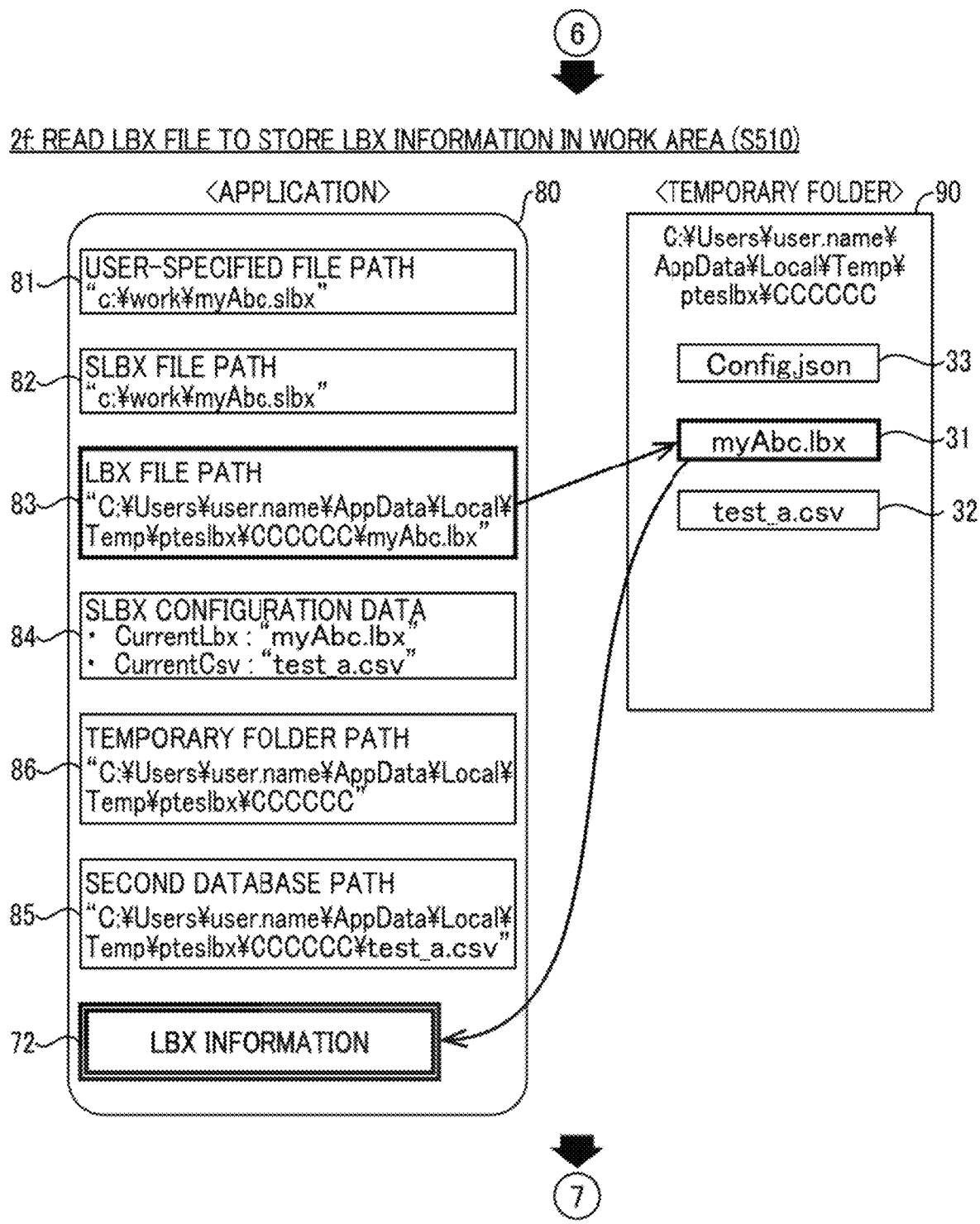
FIG. 21 is a schematic diagram illustrating a step in the LBX file opening process following the step of FIG. 20.

As shown in 2*f* in FIG. 21, in S510 at the beginning of the LBX file opening process, the controller 2 reads the LBX file 31 from the folder specified by the LBX file path 83. Here, when the open target file is in the SLBX format (S420: SLBX), the folder specified by the LBX file path 83 is the temporary folder 90 whereas when the open target file is in the LBX format (S420: LBX), the specified folder is the folder that the folder in which the target open file is saved. Specifically, the controller 2 stores, in the work area 80, LBX information 72 (FIG. 21) which is based on the LBX information 62 contained in the LBX file 31 (see also 1*e* in FIG. 13).

In S520 the controller 2 determines whether a specific file path has been set in the second database path 85. When the process in S460 (FIG. 16) has been executed prior to advancing to S520, a file path has been set in the second database path 85 (see FIG. 20). However, when the controller 2 advanced to S520 after executing the process in S480, no file path will be set in the second database path 85 and the second database path 85 will have the null value.

The controller 2 advances to S530 when determining in S520 that a specific file path is set as the second database path 85 (S520: YES).

On the other hand, the controller 2 advances to S560 when determining in S520 that a specific file path has not been set as the second database path 85 (S520: NO). In S560 the controller 2 determines whether the first database path (the path of the original database) is included in the LBX information 72 (FIG. 21). The controller 2 advances to S550 when the first database path is not included (S560: NO). The controller 2 advances to S570 when the first database path is included (S560: YES).

In S570 the controller 2 updates the second database path 85 to have the value of the first database path contained in the LBX information 72. That is, the controller 2 sets the second database path 85 to the value of the first database path.

Figure 22:
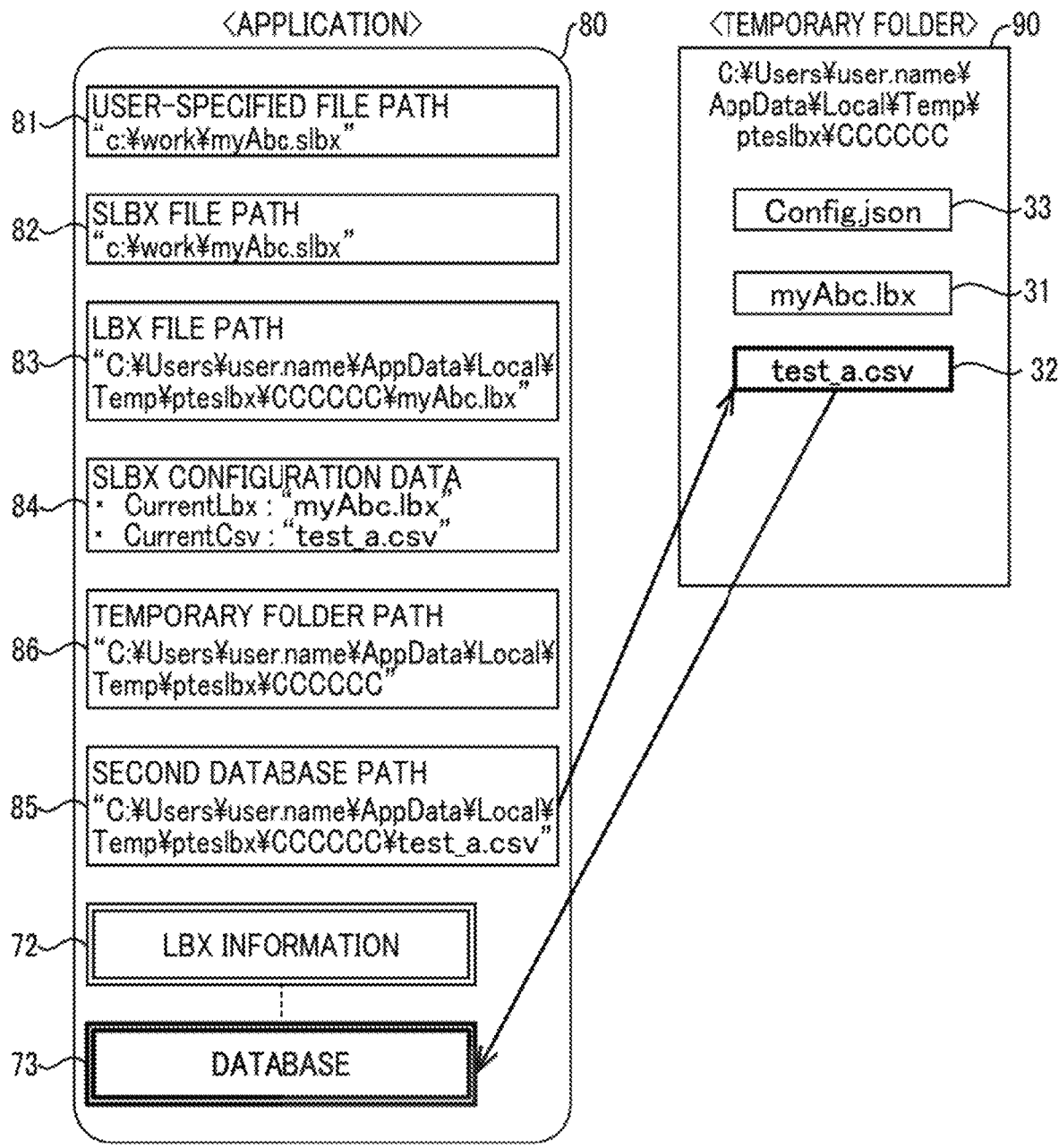
FIG. 22 is a schematic diagram illustrating a step in the LBX file opening process the step of FIG. 21.

As shown in 2*g* in FIG. 22, in S530 the controller 2 reads the database file according to the second database path 85. The controller 2 then stores the read database as a database 73 in the work area 80.

Specifically, when transitioning from S520 to S530, the second database path 85 is the file path for the CSV file in the temporary folder 90. In this case, the controller 2 reads the CSV file 32 from the temporary folder 90 specified by the second database path 85, generates the database 73 including the CSV file 32, and stores the generated database 73 in the work area 80 (see FIG. 22). Hence, the database 73 stored at this time includes a table for the CSV file 32.

When transitioning to S530 from S570, on the other hand, the second database path 85 is the file path of the original database. In this case, the controller 2 reads the original database from the folder specified by the second database path 85 and stores, as the database 73, the database in the work area 80. The controller 2 may read only tables included in the original database, generate the database 73 including the read tables, and store the generated database 73 in the work area 80.

In S540 the controller 2 associates (links) the database 73 stored in S530 to the LBX information 72 (see FIG. 22). In other words, the database 73 is linked to the LBX information 72. This process includes updating the first database path in the LBX information 72 to the value in the second database path 85.

In S550 the controller 2 displays the editing screen 10. At this time, the controller 2 updates the contents of the editing screen 10 based on the information read from the work area 80. In other words, the controller 2 displays the editing screen 10 on the basis of the label file targeted for opening.

More specifically, the controller 2 displays the label image object 16*a*, which shows the label image represented by the LBX information 72. The controller 2 also displays the table object 18 (see FIG. 4) which is based on the CSV file specified by the second database path 85.

When the label image contains data images, the controller 2 also acquires data for each data image from the database 73 based on the corresponding link information in the LBX information 72. The controller 2 then displays the acquired data as data image objects in a format based on the corresponding data image information.

When the open target file is a file in the LBX format, the controller 2 also displays the table object 18 on the basis of the database 73 which has been stored in the work area 80 by referencing the first database path and displays the data image objects on the basis of the data image information included in the LBX information 72.

Figure 23:
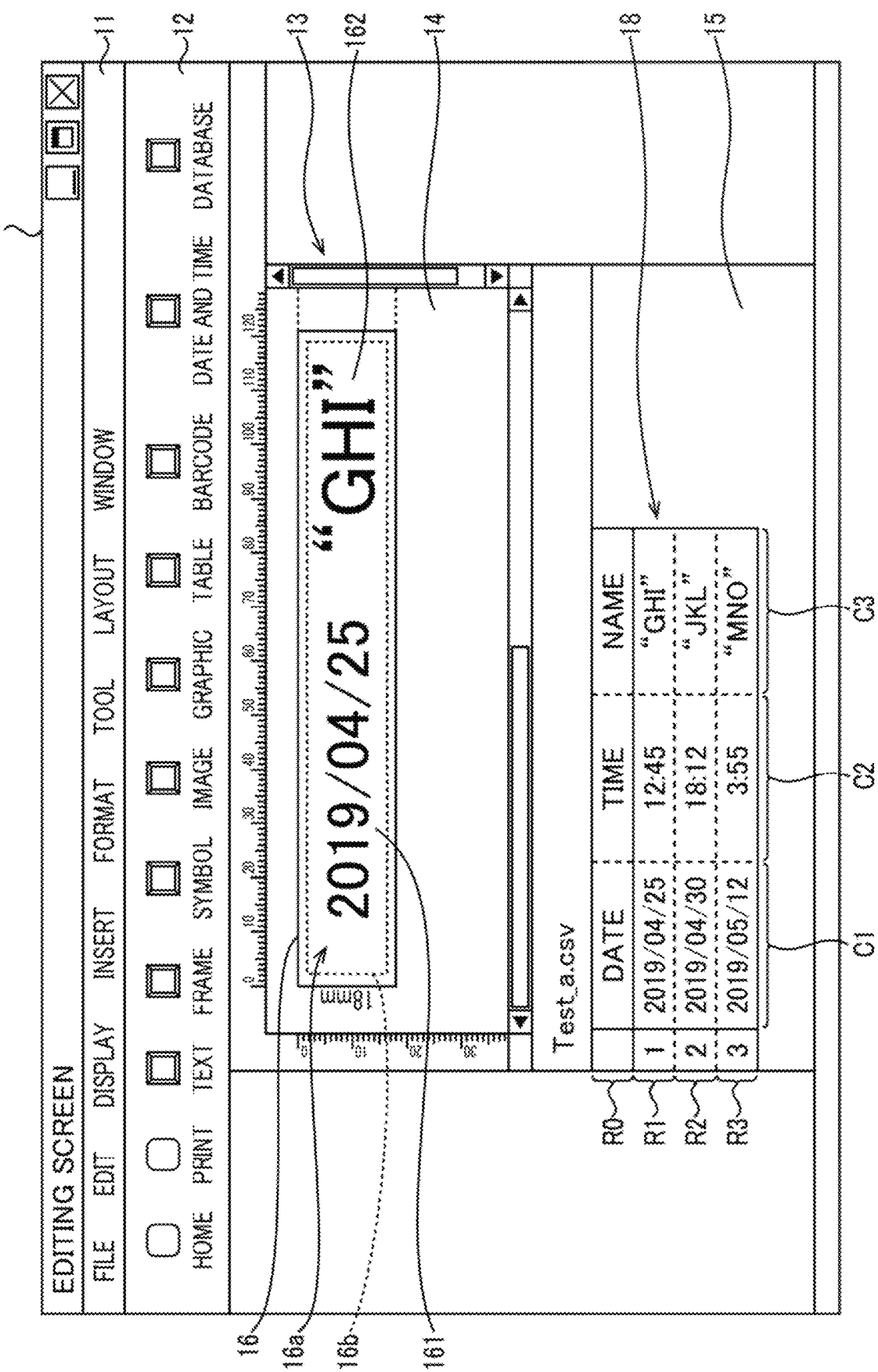
FIG. 23 is an explanatory diagram illustrating an editing screen when an SLBX file is opened.

Through this file opening process, the controller 2 reproduces the saved label image in the editing screen 10. As an example, when the file "myAbc.slbx" saved in the editing state shown in FIG. 5 is opened in the file opening process, the controller 2 displays the editing screen 10 shown in FIG. 23. The label image object 16*a* displayed in this editing screen 10 represents the label image rendered using the LBX information 72 obtained through the decompression. Because the editing screen shown in FIG. 23 is displayed on the basis of the decompressed SLBX file 30, only the data table saved as the CSV file 32 can be displayed as the table object 18.

Through the editing screen 10, the user can further edit the label image object 16*a*, instruct the printing device 101 to print the label image, and/or save the label image. In S560, the controller 2 receives these requests for editing, printing and saving based on the user's instructions, and performs the processes in accordance with the user's instructions.

When the user wishes to further save the label file that has opened in the opening process, the user can select an option to save as a new file or an option to overwrite the file.

When the option to save as a new file is selected, the new file representing the edited label image is newly generated and saved while the original label file that has been opened is unchanged.

When the option to overwrite the file is selected, the label file that has been opened is deleted, and a new file representing the edited label image is generated and saved in place of the deleted label file. Accordingly, the label file is overwritten.

Figure 24:
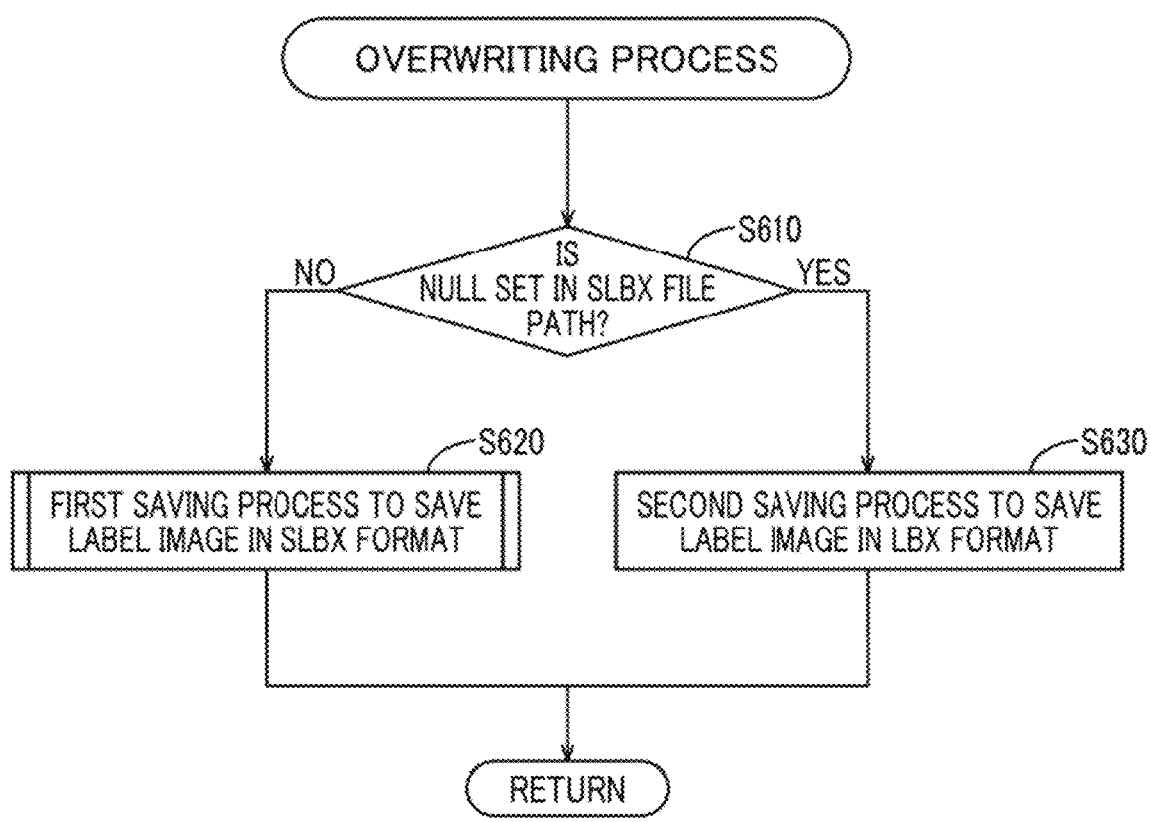
FIG. 24 is a flowchart illustrating an overwriting process.

When the option to overwrite the file is selected, the controller 2 executes an overwriting process shown in FIG. 24. The overwriting process is implemented by the controller 2 executing a corresponding program module in the label image preparation application 5*a*.

When the controller 2 starts the overwriting process, in S610 the controller 2 determines whether a null (no value) is set in the SLBX file path 82 in the work area 80. In other words, the determination made in S610 is a process to determine whether the label file to be overwritten has been opened on the basis of the SLBX file 30 or the LBX file 31 (the label file to be overwritten has been read from the SLBX file 30 or the LBX file 31). When the SLBX file 30 has been opened and the label image based on this SLBX file 30 is edited in the editing screen 10, the file path of the SLBX file 30 is stored in the SLBX file path 82. However, the LBX file 31 has been opened and the label image based on this LBX file 31 is edited in the editing screen 10, the null (no value) is set in the LSBX file path 82.

When the null (no value) is set in the SLBX file path 82, in S630 the controller 2 performs the second saving process. The second saving process is the same as the second saving process of S150 in FIG. 9, and the label image subject for overwrite (the label that is now being created) is saved as a new LBX file 31 in place of the existing LBX file 31.

When a value other than the null is set in the SLBX file path 82, in S620 the controller 2 performs the first saving process. The first saving process is the same as the first saving process of S140 in FIG. 9, and the label image subject for overwrite (the label that is now being created) is saved as a new SLBX file 30 in place of the existing SLBX file 30. That is, the controller 2 overwrites the SLBX file 30 that has been saved so that the edit on the label image is reflected on the overwritten SLBX file 30.

(1-7) Effects of the Embodiment

According to the embodiment, the LBX file 31, the CSV file 32, and the configuration file 33 can be integrated in the single SLBX file 30, and this single SLBX file 30 can be saved. Accordingly, the controller 2 can manage the database as well as the label file of the label image including the data image.

Further, the SLBX file 30 is generated by compression according to a prescribed compression format. Therefore, the SLBX file 30 can be generated easily and efficiently.

When generating the SLBX file 30, the file format of the database is converted to the CSV format. This method eliminates or relaxes restrictions on what OSes can handle the SLBX file 30.

Further, when generating the SLBX file 30, the extension for the SLBX file 30 is converted to an extension different from the standard extension for the compression format. In this way, the user can recognize that the SLBX file 30 is a label file.

Further, the temporary folder 70 is different from the destination folder for saving the file. Therefore, the SLBX file 30 can be generated without affecting the destination folder. A particular feature of the embodiment is that the temporary folder 70 is generated in what is known as a hidden folder. Accordingly, the SLBX file 30 can be generated without the user being aware that the temporary folder 70 is being used to generate the SLBX file 30. This effect also applies to the temporary folder 90 created when opening a file.

In the above embodiment, the user can select whether a label image is saved in the SLBX format or the LBX format. This provides the user with a high degree of freedom in saving formats when using the label image preparation application 5*a*.

2. Other Embodiments

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

(2-1) The temporary folder 70 may be created anywhere. That is, the temporary folder 70 may be created in a folder other than a hidden folder or may be the same folder as the destination folder specified by the user for saving the SLBX file 30. This holds true for the temporary folder 90.

(2-2) The SLBX file 30 need not possess a configuration file 33. When opening an SLBX file 30 that does not have a configuration file 33, the controller 2 may simply read the LBX file 31 and CSV file 32 stored in the temporary folder 90.

(2-3) The SLBX file 30 may be generated according to a method different from compression. That is, the LBX file 31, the CSV file 32, and the configuration file 33 may be integrated into a single file through any method. In the subsequent file opening process, the controller 2 may decompress (expand) the SLBX file 30 according to a decompression method corresponding to the integration method used when the file was saved.

The term "decompression" in this specification is not limited to the decompression of files compressed according to a compression method such as the ZIP format but has a broad meaning that includes restoring a plurality of files integrated into a single file to their original state prior to integration.

(2-4) The database table structure illustrated in FIGS. 3 through 5 is merely an example. That is, a table may have any number of records and any number of columns. Further a database may have any number of tables.

(2-5) The above embodiment illustrates a printing device 101 in which cassette-type cartridges are mounted, but the present invention may be applied to a printing device in which the mounted cartridges are different from cassette-type cartridges. The printing device of the invention is also not limited to printing devices in the form of a label printer or label writer. In other words, the present invention is not limited to printing devices configured to print images on a continuous print medium.

(2-6) A plurality of functions implemented by a single component in the embodiment described above may be implemented by a plurality of components, and a single function implemented by a single component may be implemented by a plurality of components. Similarly, a plurality of functions implemented by a plurality of components may be implemented by a single component, and a single function implemented by a plurality of components may be implemented by a single component. Additionally, some of the structures in the embodiment may be omitted. Further, at least some of the structures in the embodiment may be added to or used in place of structures in the other embodiments.

Correspondences of Terms

The label image preparation application 5a is an example of an image creation program. The label image object 16a is an example of a print image object. The label image represented by the label image object 16a is an example of a print image. The table object 18 is an example of a database object. The LBX information 62 and 72 is an example of image information. The LBX file 31 is an example of an image information file. The CSV file 32 is an example of a database file. The SLBX file 30 is an example of an extended image file. The extension "slbx" of the SLBX file 30 is an example of a specific extension. The extension "zip" of the compression files in the ZIP format is an example of a predetermined extension. The temporary folder 70 is an example of a first temporary folder. The temporary folder 90 is an example of a second temporary folder. The SLBX configuration data 61 is an example of configuration information. The operation of the open button 55 in a state that the SLBX file is selected in the file open dialog 50 is an example of a first request. The operation of the open button 55 in a state that the LBX file is selected in the file open dialog 50 is an example of a second request. The first database path is an example of database location information.

The process of S110 is an example of an image generation process and an example of a database acquisition process. The process of S120 is an example of a destination reception process and an example of a format reception process. The process of S210 is an example of a first-temporary-folder generation process. The process of S240 is an example of a second generation process. The process of S260 is an example of a first generation process. The process of S280 is an example of a third generation process. The process of S290 is an example of a filename decision process, an example of an integration process, and an example of a saving process. The process of S430 is an example of a second-temporary-folder generation process. The process of S440 is an example of a decompression process. The process of S510 is an example of an image information reading process. The process of S530 is an example of a database reading process. The process of S550 is an example of a first object display process and an example of a second object display process. The process of S620 is an example of an overwriting process.

What is claimed is:

1. A non-transitory computer readable storage medium storing a set of program instructions installed on and executed by a computer included in an information processing device, the information processing device further including a communication interface configured to communicate with a printing device, the set of program instructions, when executed by the computer, causing the information processing device to perform:

an acquiring process to acquire a database;

an image generation process to generate a print image in which a data image is incorporated, the data image representing a set of data designated by a user from one or more sets of data included in the database;

a first generation process to generate an image information file including image information to be used to render the print image;

a second generation process to generate a database file based on the database;

an integration process to integrate the image information file and the database file into a single extended image file; and a saving process to save the single extended image file in a saving folder, wherein the set of program instructions, when executed by the computer, causes the information processing device to perform:

a first temporary folder creation process to create a first temporary folder, wherein the first generation process temporarily stores the image information file in the first temporary folder, wherein the second generation process temporarily stores the database file in the first temporary folder, wherein the integration process reads the image information file and the database file from the first temporary folder for use in generating the single extended image file.

2. The non-transitory computer readable storage medium according to claim 1, wherein the integration process compresses the image information file and the database file in a predetermined compression format to generate the single extended image file.

3. The non-transitory computer readable storage medium according to claim 2, wherein the second generation process generates the database file in a file format compatible with a plurality of pieces of application software different from each other.

4. The non-transitory computer readable storage medium according to claim 2, wherein the set of program instructions, when executed by the computer, causes the information processing device to perform:
a filename determination process to determine a filename of the single extended image file, the filename including a specific file extension different from a prescribed file extension of the predetermined compression format,
wherein the saving process saves the single extended image file having the determined filename.

5. The non-transitory computer readable storage medium according to claim 1, wherein the set of program instructions, when executed by the computer, causes the information processing device to perform:
a saving-folder reception process to receive an operation to designate the saving folder,
wherein the saving process saves the single extended image file in the designated saving folder,
wherein the first temporary folder creation process creates the first temporary folder different from the designated saving folder.

6. The non-transitory computer readable storage medium according to claim 1, wherein the integration process performs file-compression to generate the single extended image file as a compressed file,
wherein the set of program instructions, when executed by the computer, causes the information processing device to perform:
a decompression process to obtain the image information file and the database file from the single extended image file by decompressing the single extended image file; and
an object display process to display a print image object and a database object on a display provided in the information processing device, the print image object representing the print image and being rendered using the image information included in the image information file obtained in the decompression process, the database object representing the database and being rendered using the database file obtained in the decompression process.

7. The non-transitory computer readable storage medium according to claim 6, wherein the set of program instructions, when executed by the computer, causes the information processing device to perform:
a second temporary folder creation process to create a second temporary folder,
wherein the decompression process temporarily stores, in the second temporary folder, the image information file and the database file both obtained through decompression of the single extended image file.

8. The non-transitory computer readable storage medium according to claim 7, wherein the second temporary folder creation process creates the second temporary folder different from the saving folder.

9. The non-transitory computer readable storage medium according to claim 7, wherein the set of program instructions, when executed by the computer, causes the information processing device to perform:
an image information reading process to read the image information from the image information file temporarily stored in the second temporary folder; and
a database reading process to read the database from the database file temporarily stored in the second temporary folder,
wherein the print image object is rendered using the image information read in the image information reading process, and the database object is rendered using the database read in the database reading process.

10. The non-transitory computer readable storage medium according to claim 1, wherein the print image is printed on a printing medium extending in a longitudinal direction in the printing device while the printing medium is being conveyed in the longitudinal direction.

11. A non-transitory computer readable storage medium storing a set of program instructions installed on and executed by a computer included in an information processing device, the information processing device further including a communication interface configured to communicate with a printing device, the set of program instructions, when executed by the computer, causing the information processing device to perform:
an acquiring process to acquire a database;
an image generation process to generate a print image in which a data image is incorporated, the data image representing a set of data designated by a user from one or more sets of data included in the database;
a first generation process to generate an image information file including image information to be used to render the print image;
a second generation process to generate a database file based on the database;
an integration process to integrate the image information file and the database file into a single extended image file; and
a saving process to save the single extended image file in a saving folder,
wherein the set of program instructions, when executed by the computer, causes the information processing device to perform:
a third generation process to generate a configuration file including name information, the name information specifying a filename of the image information file and a table name of the database file,
wherein the integration process further integrates the configuration file as well as the image information file and the database file into the single extended image file.

12. The non-transitory computer readable storage medium according to claim 11, wherein the set of program instructions, when executed by the computer, causes the information processing device to perform:
a format reception process to receive an operation to designate a first file format or a second file format, the first file format being a container format, the second file format not being the container format,
wherein when the format reception process receives the operation to designate the first file format, the integration process is performed,
wherein when the format reception process receives the operation to designate the second file format, the integration process is not performed, and the saving process saves the image information file generated in the first generation process.

13. The non-transitory computer readable storage medium according to claim 12, wherein the integration process performs file-compression to generate the single extended image file as a compressed file,
wherein the set of program instructions, when executed by the computer, causes the information processing device to perform:
an open request reception process to receive a first open request or a second open request, the first open request being a request to open the single extended image file saved in the first file format, the second open request being a request to open a second image information file saved in the second file format;
in response to the first open request being received, a decompression process to obtain the image information file and the database file from the single extended image file by decompressing the single extended image file;
a first object display process to display, on a display provided in the information processing device, a first print image object and a database object, the first print image object representing the print image rendered using the image information included in the image information file obtained in the decompression process, the database object representing the database and being rendered using the database file obtained in the decompression process; and
in response to the second open request being received, a second object display process to display, on the display, a second print image object rendered using the second image information file saved in the second file format.

14. The non-transitory computer readable storage medium according to claim 13, wherein the second image information file saved in the second file format includes image data representing a base image, and location information specifying a storage location of the database that records the set of data to be used for rendering the data image,
wherein the second object display process further displays, on the display, a database object representing the database stored at the storage location specified in the location information.

15. The non-transitory computer readable storage medium according to claim 6, wherein the image generation process includes an editing process to perform an edit on the print image according to a received operation on the print image object displayed on the display,
wherein the set of program instructions, when executed by the computer, causes the information processing device to perform:
an overwrite reception process to receive an overwrite request to overwrite the single extended image file; and
in a case that the overwrite request is received after the editing process has edited the print image, an overwriting process to overwrite the single extended image file saved in the saving process so that the edit on the print image is reflected in the overwritten single extended image file.

16. An information processing device comprising:
a communication interface configured to communicate with a printing device; and
a controller configured to perform:
an acquiring process to acquire a database;
an image generation process to generate a print image in which a data image is incorporated, the data image representing a set of data designated by a user from one or more sets of data included in the database;
a first generation process to generate an image information file including image information to be used to render the print image;
a second generation process to generate a database file based on the database;
an integration process to integrate the image information file and the database file into a single extended image file;
a saving process to save the single extended image file in a saving folder, and
wherein the controller is configured to further perform:
a first temporary folder creation process to create a first temporary folder,
wherein the first generation process temporarily stores the image information file in the first temporary folder,
wherein the second generation process temporarily stores the database file in the first temporary folder,
wherein the integration process reads the image information file and the database file from the first temporary folder for use in generating the single extended image file.

17. The information processing device according to claim 16, wherein the controller is configured to further perform:
a saving-folder reception process to receive an operation to designate the saving folder,
wherein the saving process saves the single extended image file in the designated saving folder,
wherein the first temporary folder creation process creates the first temporary folder different from the designated saving folder.

18. An information processing device comprising:
a communication interface configured to communicate with a printing device; and
a controller configured to perform:
an acquiring process to acquire a database;
an image generation process to generate a print image in which a data image is incorporated, the data image representing a set of data designated by a user from one or more sets of data included in the database;
a first generation process to generate an image information file including image information to be used to render the print image;
a second generation process to generate a database file based on the database;
an integration process to integrate the image information file and the database file into a single extended image file; and
a saving process to save the single extended image file in a saving folder,
wherein the controller is configured to further perform:
a third generation process to generate a configuration file including name information, the name information specifying a filename of the image information file and a table name of the database file,
wherein the integration process further integrates the configuration file as well as the image information file and the database file into the single extended image file.

19. The information processing device according to claim 18, wherein the controller is configured to further perform:
a format reception process to receive an operation to designate a first file format or a second file format, the first file format being a container format, the second file format not being the container format,
wherein when the format reception process receives the operation to designate the first file format, the integration process is performed, wherein when the format reception process receives the operation to designate the second file format, the integration process is not performed, and the saving process saves the image information file generated in the first generation process.

20. A non-transitory computer readable storage medium storing a set of program instructions installed on and executed by a computer included in an information processing device, the information processing device further including a communication interface configured to communicate with a printing device, the set of program instructions, when executed by the computer, causing the information processing device to perform:
- an acquiring process to acquire a database;
- an image generation process to generate a print image in which a data image is incorporated, the data image representing a set of data designated by a user from one or more sets of data included in the database;
- a first generation process to generate an image information file including image information to be used to render the print image;
- a second generation process to generate a database file based on the database;
- an integration process to integrate the image information file and the database file into a single extended image file; and
- a saving process to save the single extended image file in a saving folder,
- wherein the set of program instructions, when executed by the computer, causes the information processing device to perform:
  - a format reception process to receive an operation to designate a first file format or a second file format, the first file format being a container format, the second file format not being the container format,
- wherein when the format reception process receives the operation to designate the first file format, the integration process is performed,
- wherein when the format reception process receives the operation to designate the second file format, the integration process is not performed, and the saving process saves the image information file generated in the first generation process.

21. The non-transitory computer readable storage medium according to claim 20, wherein the integration process performs file-compression to generate the single extended image file as a compressed file,
wherein the set of program instructions, when executed by the computer, causes the information processing device to perform:
- an open request reception process to receive a first open request or a second open request, the first open request being a request to open the single extended image file saved in the first file format, the second open request being a request to open a second image information file saved in the second file format;
- in response to the first open request being received, a decompression process to obtain the image information file and the database file from the single extended image file by decompressing the single extended image file;
- a first object display process to display, on a display provided in the information processing device, a first print image object and a database object, the first print image object representing the print image rendered using the image information included in the image information file obtained in the decompression process, the database object representing the database and being rendered using the database file obtained in the decompression process; and
- in response to the second open request being received, a second object display process to display, on the display, a second print image object rendered using the second image information file saved in the second file format.

22. The non-transitory computer readable storage medium according to claim 21, wherein the second image information file saved in the second file format includes image data representing a base image, and location information specifying a storage location of the database that records the set of data to be used for rendering the data image,
wherein the second object display process further displays, on the display, a database object representing the database stored at the storage location specified in the location information.

23. An information processing device comprising:
- a communication interface configured to communicate with a printing device; and
- a controller configured to perform:
  - an acquiring process to acquire a database;
  - an image generation process to generate a print image in which a data image is incorporated, the data image representing a set of data designated by a user from one or more sets of data included in the database;
  - a first generation process to generate an image information file including image information to be used to render the print image;
  - a second generation process to generate a database file based on the database;
  - an integration process to integrate the image information file and the database file into a single extended image file; and
- a saving process to save the single extended image file in a saving folder,
wherein the controller is configured to further perform:
  - a format reception process to receive an operation to designate a first file format or a second file format, the first file format being a container format, the second file format not being the container format,
wherein when the format reception process receives the operation to designate the first file format, the integration process is performed,
wherein when the format reception process receives the operation to designate the second file format, the integration process is not performed, and the saving process saves the image information file generated in the first generation process.

* * * * *